United States Patent
Di Censo et al.

(10) Patent No.: US 10,261,519 B2
(45) Date of Patent: Apr. 16, 2019

(54) TECHNIQUES FOR ARRANGING STAGE ELEMENTS ON A STAGE

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 673 days.

(21) Appl. No.: 14/289,515

(22) Filed: May 28, 2014

(65) Prior Publication Data
US 2015/0346731 A1    Dec. 3, 2015

(51) Int. Cl.
*G05D 3/00* (2006.01)
*G05B 15/02* (2006.01)
(Continued)

(52) U.S. Cl.
CPC ............. *G05D 3/00* (2013.01); *G05B 15/02* (2013.01); *H04R 5/02* (2013.01); *H04R 29/007* (2013.01);
(Continued)

(58) Field of Classification Search
CPC ........ H04S 7/30; H04S 7/302; H04S 2400/11; H04S 2420/05; G01H 1/0008; G01H 2220/111
(Continued)

(56) References Cited

U.S. PATENT DOCUMENTS

| | | | | |
|---|---|---|---|---|
| 6,140,565 A | * | 10/2000 | Yamauchi | G10H 1/0008 84/477 R |
| 7,742,609 B2 | * | 6/2010 | Yeakel | H04H 60/04 369/3 |
| 8,746,895 B2 | * | 6/2014 | Archdale | H05B 37/029 315/149 |

(Continued)

FOREIGN PATENT DOCUMENTS

CN        1984507 A       6/2007
KR     20050059840 A      6/2005
(Continued)

OTHER PUBLICATIONS

European Search Report dated Oct. 21, 2015 in Application No. 15165829.1-1559.

*Primary Examiner* — Crystal J Barnes-Bullock
(74) *Attorney, Agent, or Firm* — Artegis Law Group, LLP

(57) ABSTRACT

A stage arrangement system is configured to arrange stage elements on a stage where a performance is to take place. The stage arrangement system is configured to move the stage elements to reflect arrangement data that reflects desired positions and orientations for each stage element. The stage arrangement system first localizes one or more stage elements by determining the position and orientation associated with each such element. Then, the stage arrangement system repositions and/or reorients each stage element to comply with the arrangement data. Each stage element may indicate position and/or orientation changes to stagehands or manual laborers, who then move each element accordingly. Alternatively, each stage element may autonomously move in order to implement the position and/or orientation changes.

18 Claims, 32 Drawing Sheets

(51) Int. Cl.
*H04S 7/00* (2006.01)
*H04R 5/02* (2006.01)
*H04R 29/00* (2006.01)

(52) U.S. Cl.
CPC ............... *H04S 7/30* (2013.01); *H04S 7/302* (2013.01); *H04R 2205/024* (2013.01); *H04S 2400/11* (2013.01); *H04S 2420/05* (2013.01)

(58) Field of Classification Search
USPC ................. 700/94; 715/727; 472/75
See application file for complete search history.

(56) References Cited

U.S. PATENT DOCUMENTS

| 8,926,441 | B2* | 1/2015 | Fox | H04R 1/02 472/136 |
| 8,942,395 | B2* | 1/2015 | Lissaman | H04R 27/00 381/303 |
| 2004/0030425 | A1* | 2/2004 | Yeakel | H04H 60/04 700/94 |
| 2005/0077843 | A1* | 4/2005 | Benditt | H05B 37/029 315/312 |
| 2014/0239086 | A1* | 8/2014 | Wong | B05B 17/08 239/18 |
| 2016/0050508 | A1* | 2/2016 | Redmann | H04S 7/30 381/303 |

FOREIGN PATENT DOCUMENTS

| KR | 101100165 B1 | 12/2011 |
| WO | 01/59813 A2 | 8/2001 |
| WO | 2004030403 A1 | 4/2004 |
| WO | 2013/089930 A1 | 6/2013 |

\* cited by examiner

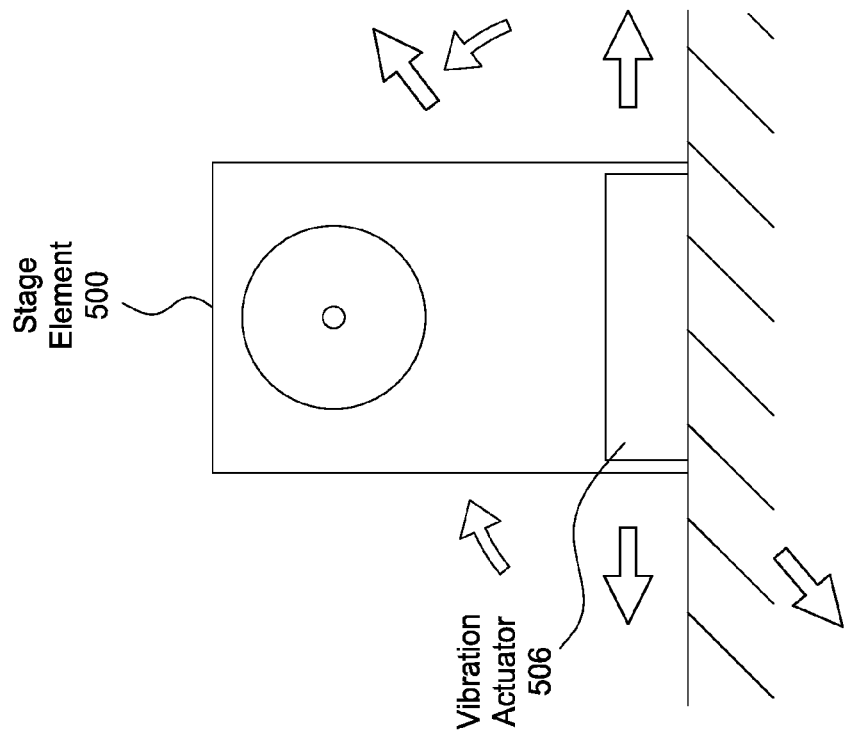
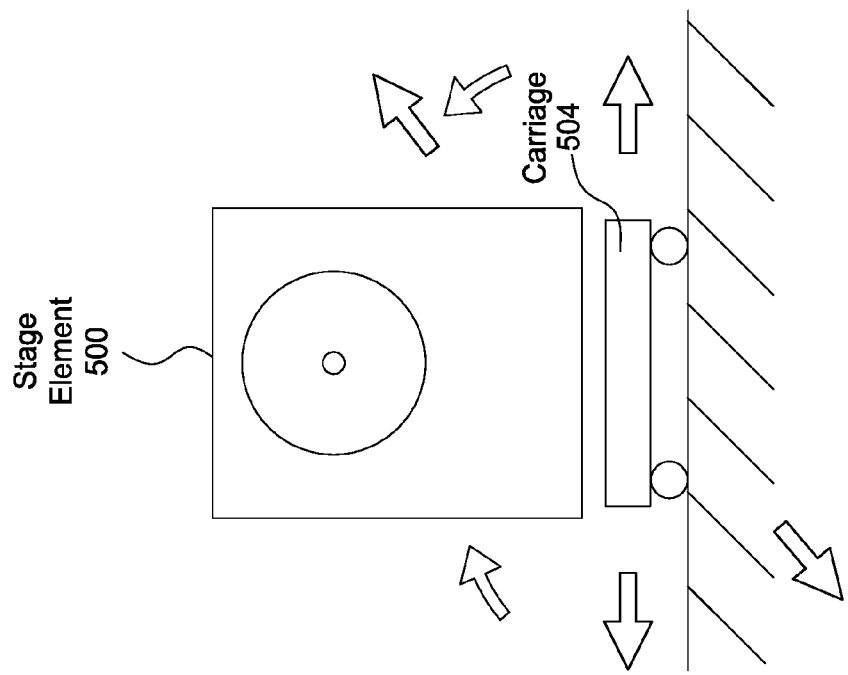

TECHNIQUES FOR ARRANGING STAGE ELEMENTS ON A STAGE

BACKGROUND

Field of the Embodiments of the Invention

Embodiments of the present invention relate generally to stage setup, and, more specifically, to techniques for arranging stage elements on a stage.

Description of the Related Art

Live events are a wildly popular form of entertainment. Concerts, plays, stand-up comedy, and other such events draw throngs of people each year. Such events oftentimes take place on a stage that requires a plethora of different types of audio equipment, such as microphones, speakers, monitors, and other stage elements. Prior to a given event, a stage crew arranges the stage elements on the stage to achieve a particular sound quality. The stage crew may then test those elements and rearrange the stage elements, as needed, in an effort to achieve more optimal sound quality. During the event, the stage crew may rearrange the stage elements to effect different audio capabilities. For example, in a concert, the stage crew may rearrange the stage elements to prepare for a particular song. Alternatively, rearrangement may be needed when stage elements are accidentally moved.

One problem with conventional techniques for arranging stage elements is that such elements must be moved manually. Many stage elements are bulky and unwieldy, such as public address (PA) speakers and the like, and therefore difficult or dangerous for laborers to move around on the stage. These issues complicate initial setup because many laborers are required to position the various stage elements required for a given event. When the stage elements need to be rearranged during the event, the aforementioned issues are magnified since the audience is required to wait while such rearranging takes place. Furthermore, in many cases, the rearranging needs to happen during the event (without interrupting the flow of the event), and therefore has to be done in a way that the audience does not get distracted from the event.

Another problem with conventional stage setup techniques is that optimal sound quality may be difficult or impossible to achieve without precise positioning and orienting of stage elements. With manual setup approaches, such precise arrangements are usually unrealistic. Accordingly, the sound quality associated with a given stage setup is limited by the precision with which the corresponding stage elements can be arranged.

As the foregoing illustrates, arranging stage elements is a complicated and error-prone task that requires the cooperative effort of teams of manual laborers. Conventional manual approaches may be extremely time consuming and require many iterations before an arrangement having acceptable sound quality can be accomplished.

SUMMARY

One or more embodiments set forth include a non-transitory computer-readable medium storing program instructions that, when executed by a processing unit, cause the processing unit to cause one or more stage elements to be arranged on a stage by performing the steps of determining a current arrangement associated with a first stage element, determining a desired arrangement for the first stage element, and causing an arrangement change to be effected for the first stage element that causes the current arrangement to reflect the desired arrangement.

At least one advantage of the present invention is that complex arrangements may be accomplished with relative ease compared to prior approaches, since the stage arrangement system described in the present application is capable of autonomously effecting arrangement changes.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the invention subsumes other embodiments as well.

FIGS. 5A-5B illustrate various mechanical actuators coupled to a stage element and configured to cause the stage element to move to a new position and/or orientation, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Arranging Stage Elements on a Stage

Figure 1A:
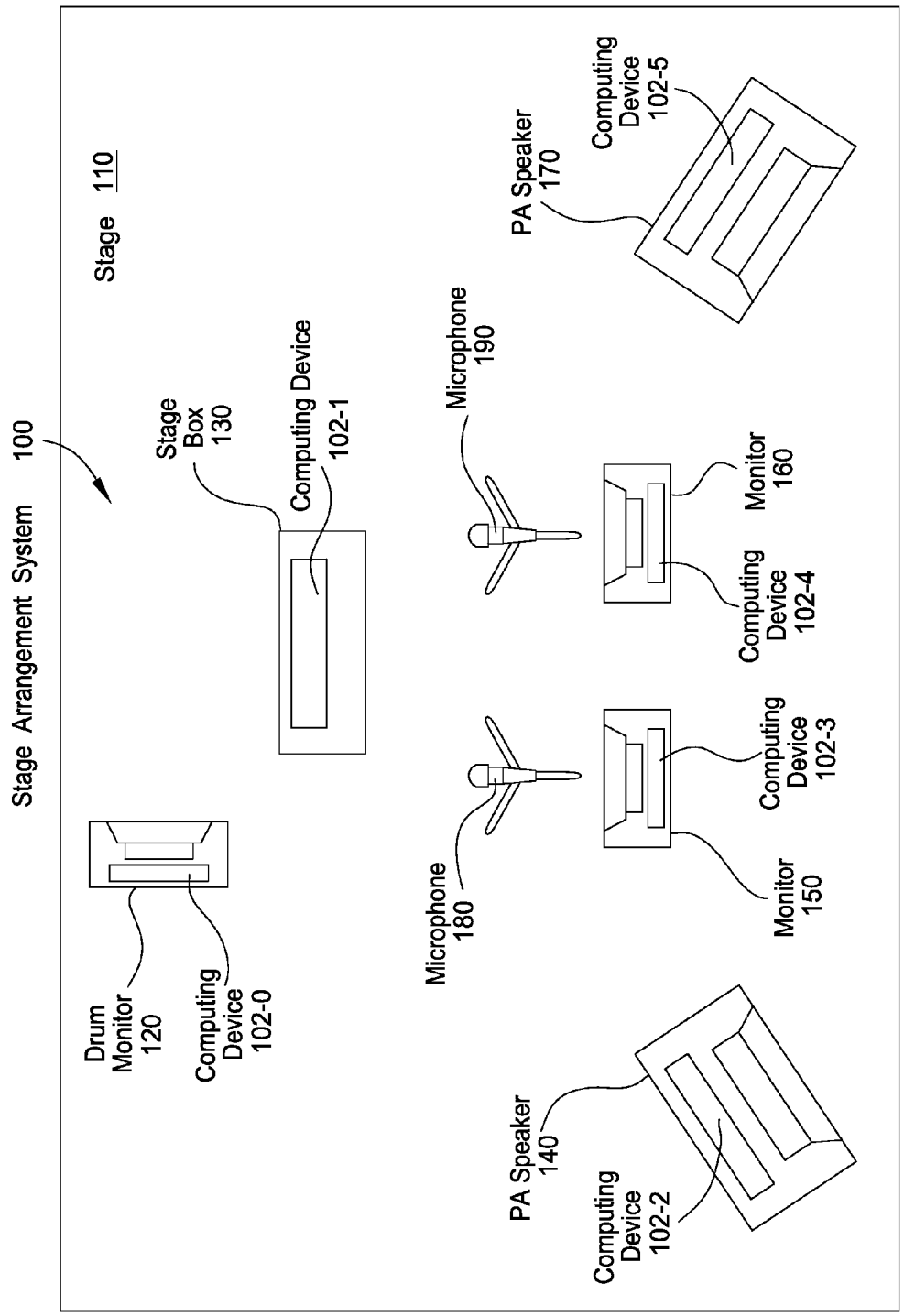
FIGS. 1A-1C illustrate a stage arrangement system configured to effect arrangements for a plurality of stage elements, according to various embodiments.

FIG. 1A illustrates a stage arrangement system 100 configured to effect arrangements for a plurality of stage elements on a stage 110, according to various embodiments. Stage 110 could reside within an auditorium, concert hall, and so forth, without limitation, and generally represents a performance area for a live event. Stage arrangement system 100 is configured to effect different arrangements for the stage elements on stage 110 using various techniques, as described in conjunction with FIGS. 1A-7. In addition, stage arrangement system is configured to generate stage arrangements and calibrate sound output associated with those arrangements, as described in greater detail below in conjunction with FIGS. 8-13. Finally, stage arrangement system 100 is configured to effect stage arrangements for the stage elements on stage 110 in order to reduce feedback, as described in greater detail below in conjunction with FIGS. 14A-16.

As shown in FIG. 1A, the stage elements on stage 110 may include a drum monitor 120, stage box 130, a public address (PA) speaker 140, monitors 150 and 160, another PA speaker 170, and microphones 180 and 190. Drum monitor 120 and monitors 150 and 160 are speakers configured to generate audio output for the benefit of performers on stage 110. Drum monitors 120 and monitors 150 and 160 may be part of a "foldback" system, as is known in the art. PA speakers 140 and 170, on the other hand, are speakers configured to generate audio output for the benefit of the audience. Microphones 180 and 190 are audio input devices configured to transduce sound generated by a vocalist, musician, and so forth, without limitation, for output on monitors 150 and/or 160 and PA speakers 140 and/or 170. Although not shown, a microphone coupled to a drum set may be configured to transduce sound generated by the drum set for output by drum monitor 120, PA speaker 140 and/or 170. Each of the stage elements discussed thus far may be coupled to stage box 130, which may represent a central junction for those various stage elements.

Each of the stage elements described above includes a computing device 102 configured to participate in the functionality of stage arrangement system 100 described herein. As is shown, drum monitor 120 includes computing device 102-0, stage box 130 includes computing device 102-1, PA speaker 140 includes computing device 102-2, monitor 150 includes computing device 102-3, monitor 160 includes computing device 102-4, and PA speaker 170 includes computing device 102-5. Microphones 180 and 190 may also include instances of a computing device 102, although none are shown for the sake of clarity. In other embodiments, any given stage element may be associated with at least one computing device that resides external to that stage element, where the at least one computing device is configured to implement any of the functionality of computing device(s) 102 described herein.

Figure 2A:
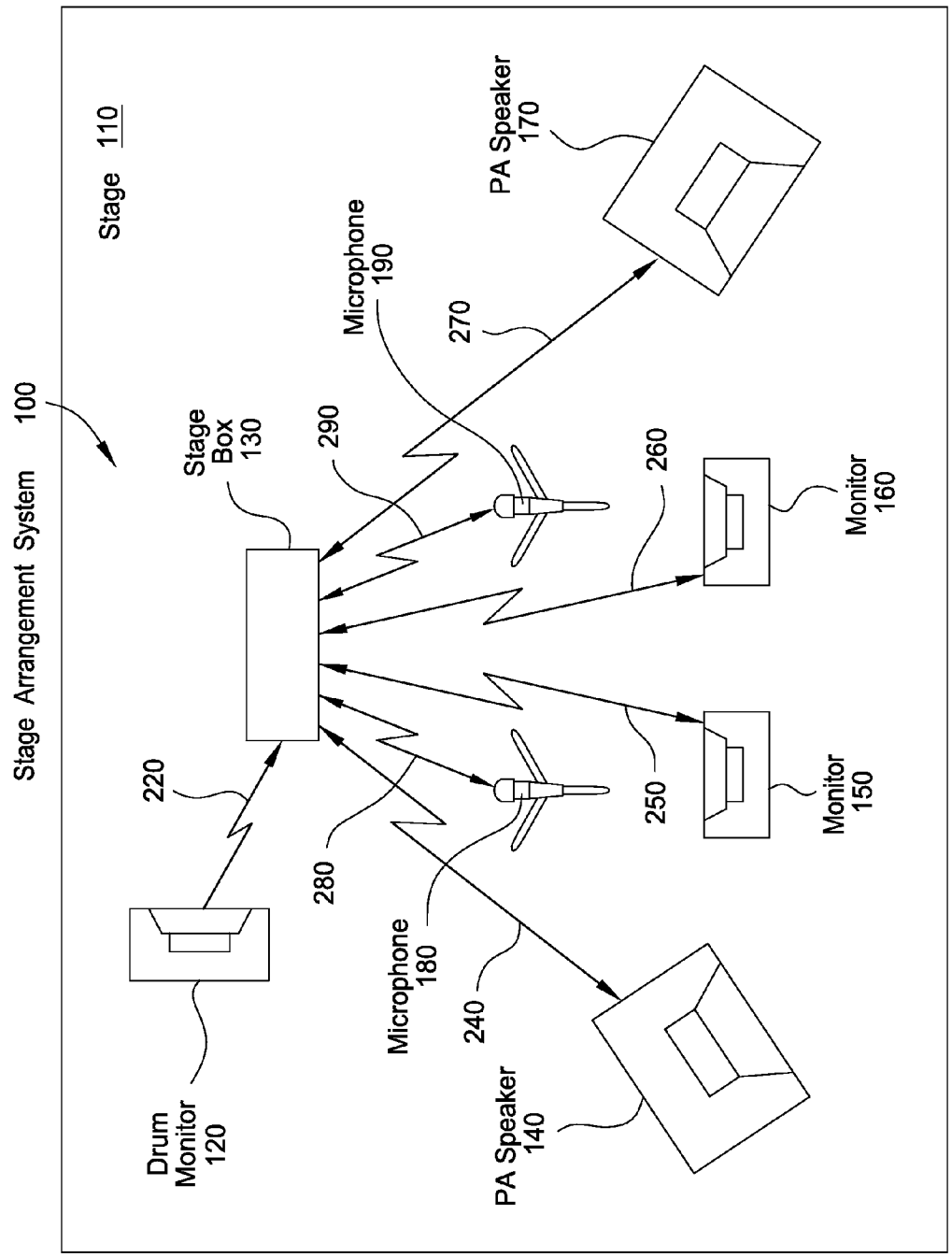
FIGS. 2A-2B illustrate the stage arrangement system of FIGS. 1A-1C configured to localize the plurality of stage elements relative to a central location, according to various embodiments.
Figure 2B:
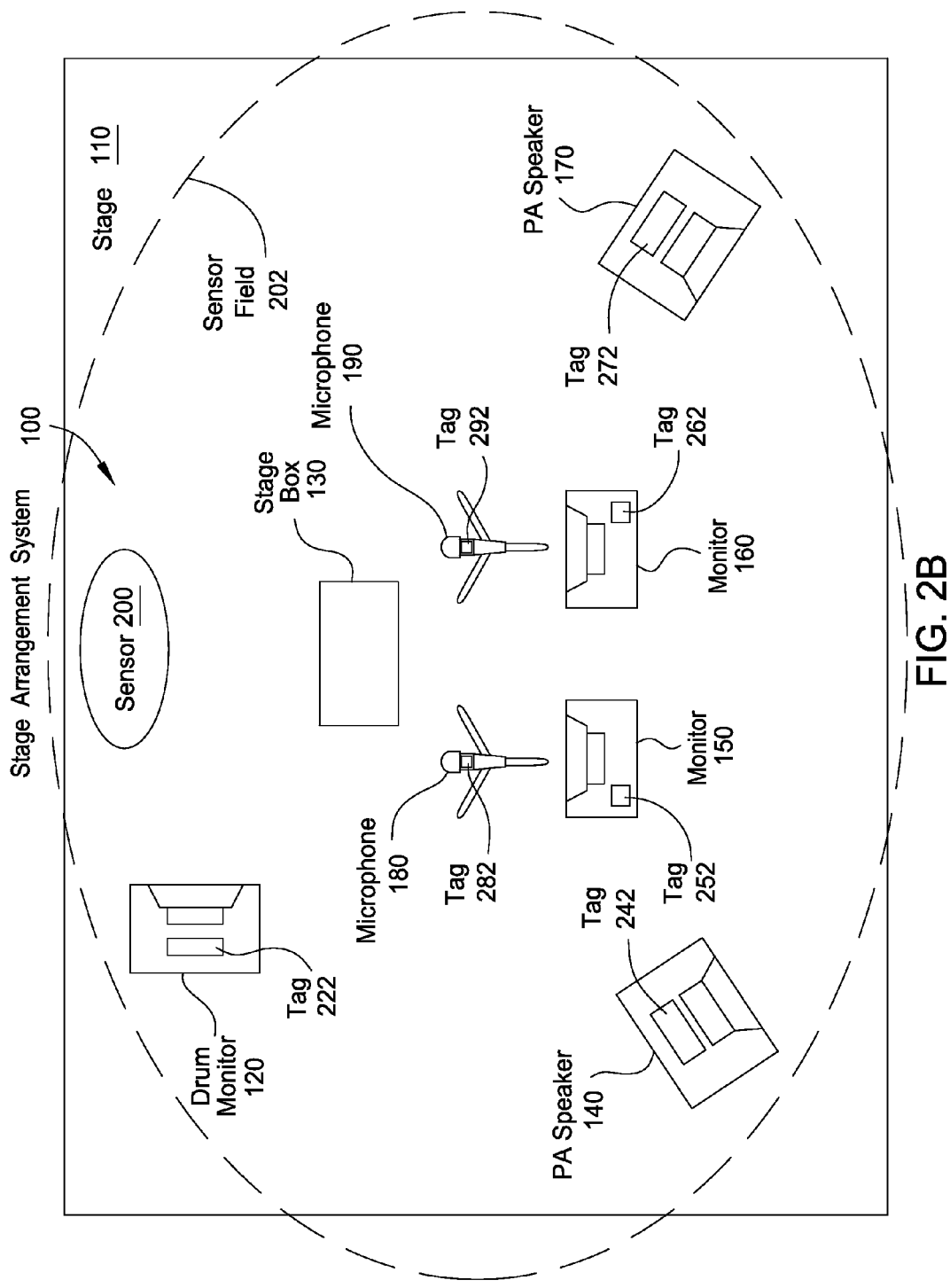
Figure 3A:
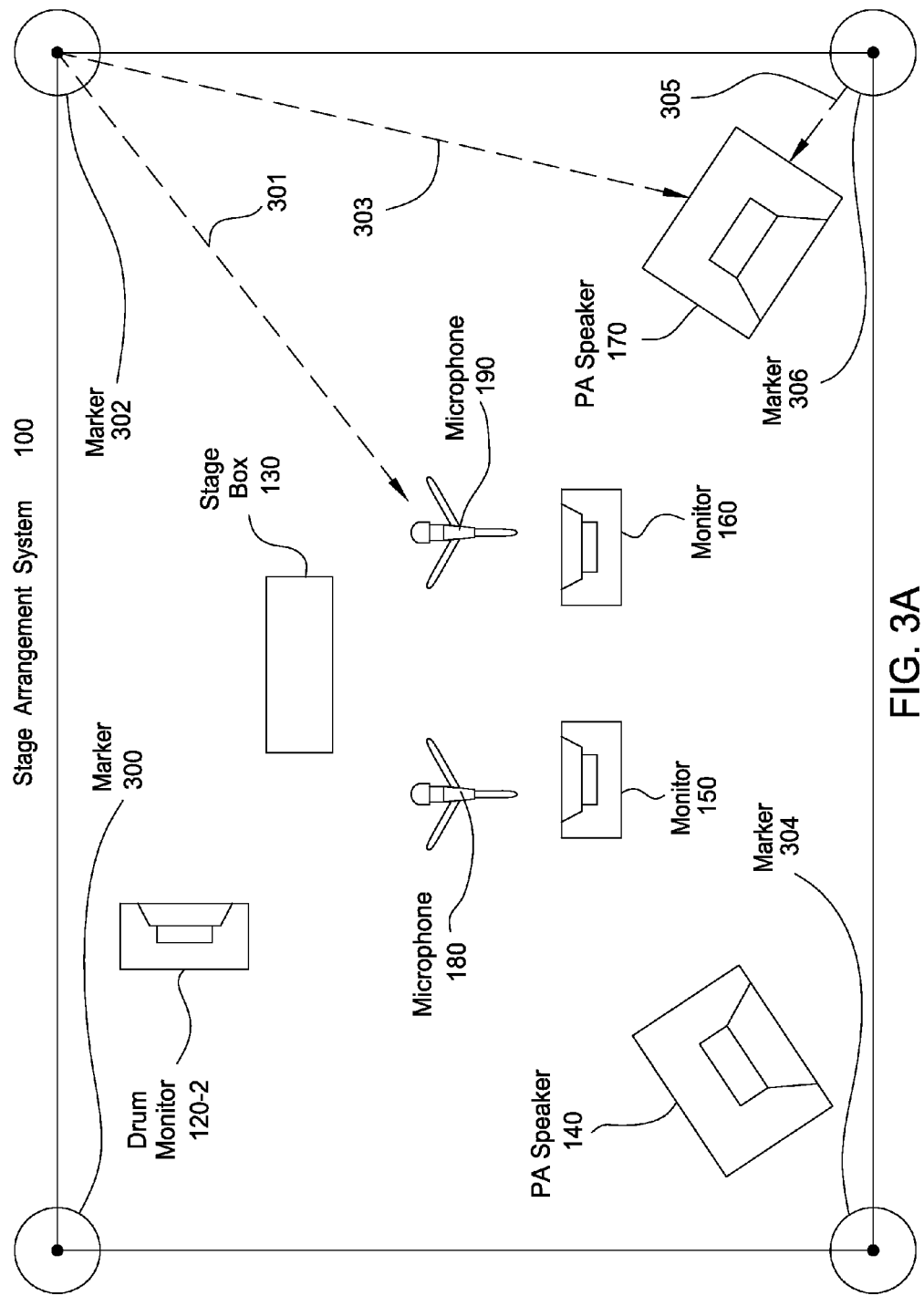
FIGS. 3A-3B illustrate the stage arrangement system of FIGS. 1A-1C configured to localize the plurality of stage elements relative to various decentralized locations, according to various embodiments.
Figure 3B:
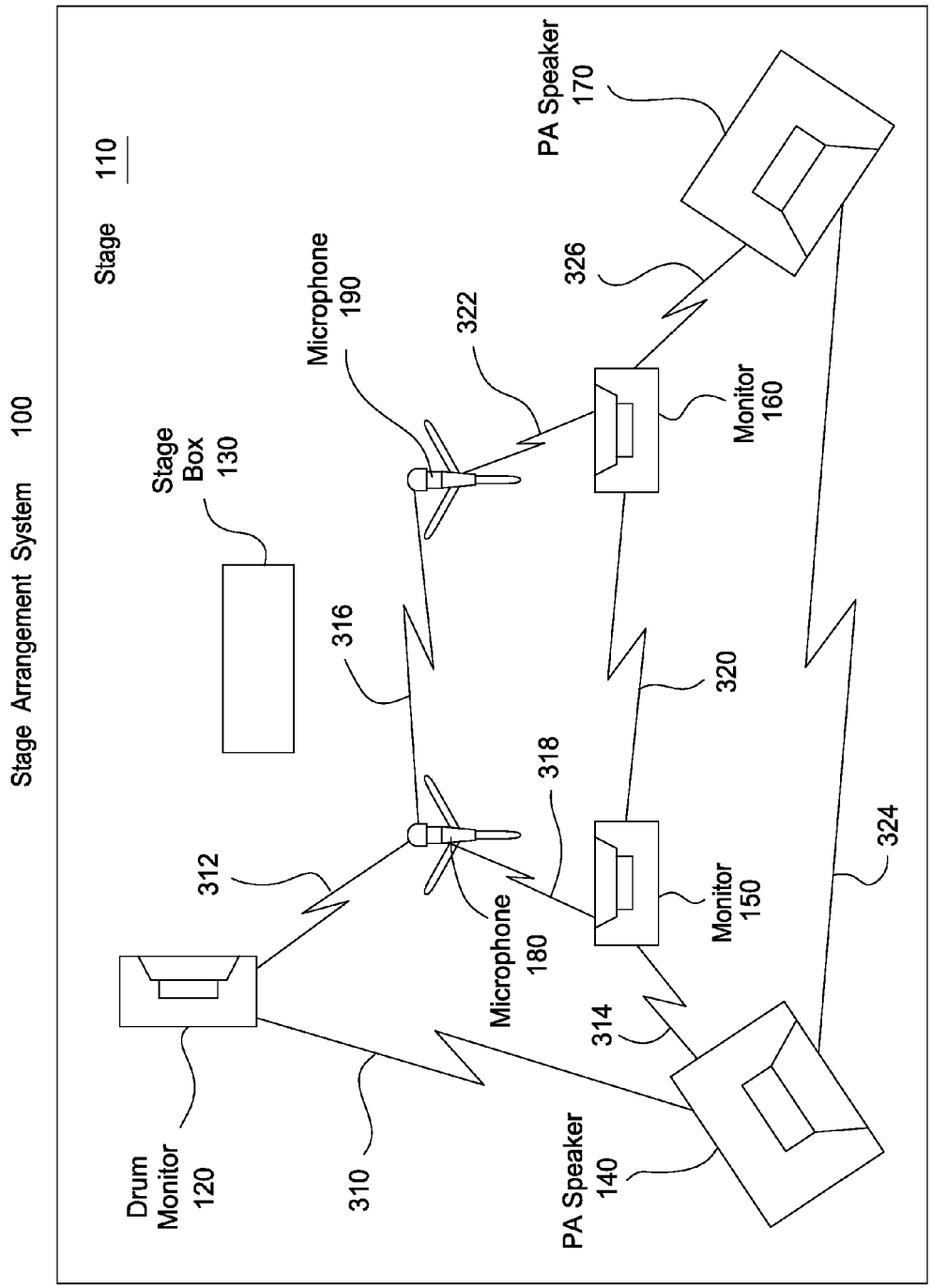

Computing devices 102 within the stage elements of stage 110 are configured to interoperate with one another in order to effect different stage arrangements, as described in greater detail below on conjunction with FIGS. 1B-1C. In doing so, each stage element first participates in a localization procedure. In the context of this disclosure, "localization" refers to a process for determining a position and an orientation of a stage element relative to a reference position and orientation, respectively. FIGS. 2A-2B illustrate different techniques for localizing the stage elements on stage 110 relative to a central location, while FIGS. 3A-3B illustrate different techniques for localizing those stage elements relative to multiple non-centralized locations.

Once the stage elements have been localized, each stage element effects position and/or orientation changes to assume a new arrangement. The new arrangement may reflect a desired arrangement provided by the performers of the live event, an arrangement recommended by the stage crew of stage 110, a default arrangement, or a shared arrangement acquired from a different set of performers. A stage element may effect position and/or orientation changes by outputting instructions to a stage hand regarding where to place the stage element and how that element should be oriented. This particular technique is described in greater detail below in conjunction with FIGS. 4A-4B. Alternatively, a stage element may effect position and/or orientation changes via mechanical actuators coupled to the stage element and controlled by a computing device 102 also coupled to thereto. With this alternative technique, the stage element may autonomously perform a repositioning and/or reorienting operation, as described in greater detail below in conjunction with FIGS. 5A-5B.

Although the present disclosure provides alternative implementations for many of the techniques described herein, the essential localization and rearrangement process is described below in conjunction with FIGS. 1B-1C.

Figure 1B:
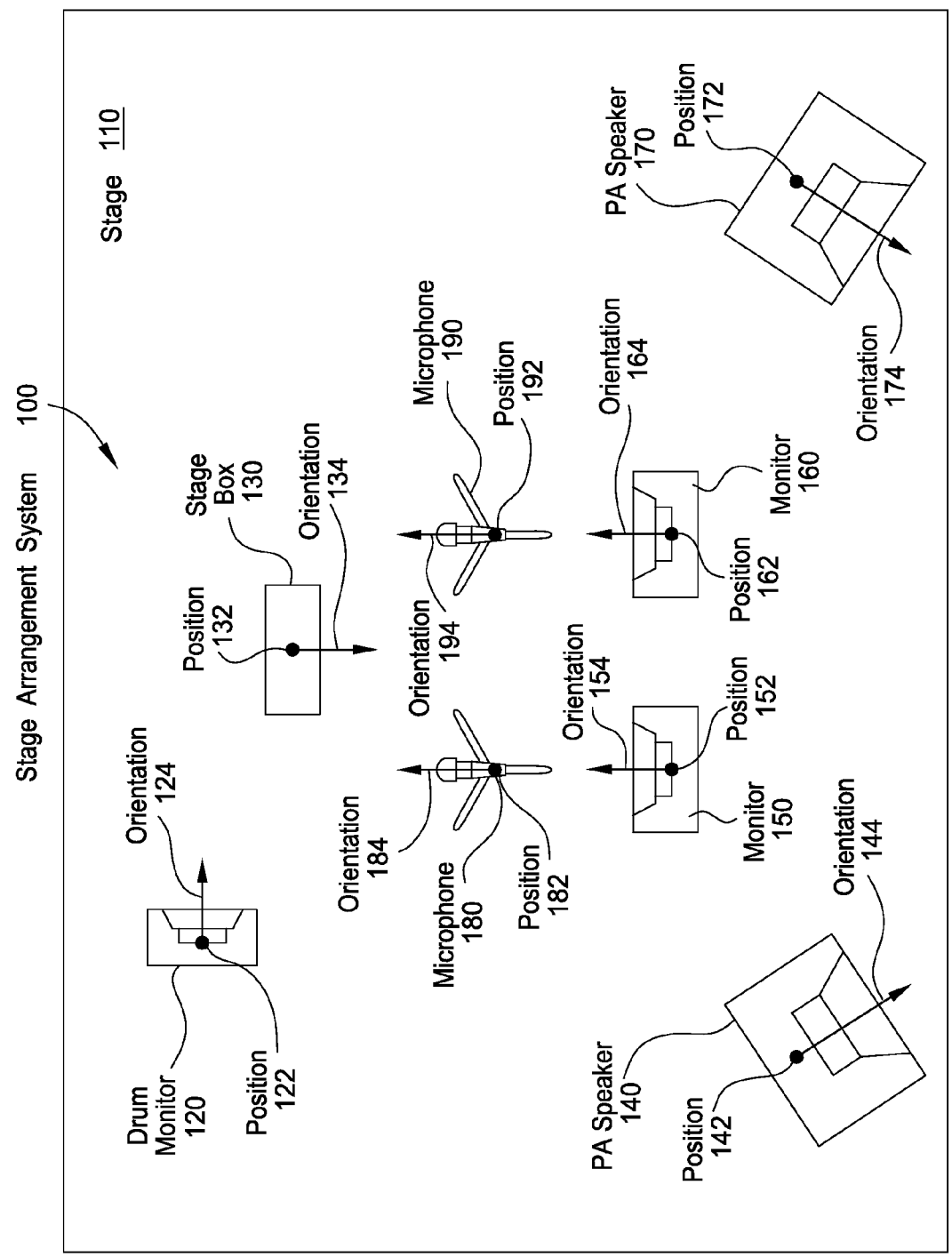

FIG. 1B illustrates stage arrangement system 100 of FIG. 1A, including the stage elements of stage 110, during the localization process mentioned above. Each stage element resides at a corresponding position and with a particular orientation. As shown by way of example and not limitation, drum monitor 120 resides at position 122 and with orientation 124, stage box 130 resides at position 132 with orientation 134, PA speaker 140 resides at position 142 with orientation 144, monitor 150 resides at position 152 with orientation 154, monitor 160 resides at position 162 with orientation 164, PA speaker 170 resides at position 172 with orientation 174, microphone 180 resides at position 182 with orientation 184, and microphone 190 resides at position 192 with orientation 194.

Stage arrangement system 100 is configured to identify the positions and orientations of the stage elements on stage 110 as part of the localization process described above. Persons skilled in the art of sound engineering will readily understand that the arrangement of stage elements on stage 110 is central to achieving a desired sound quality. Upon localizing the stage elements of stage 110, stage arrangement system 100 is configured to rearrange some or all of the stage elements, by repositioning and/or reorienting those elements, in an effort to achieve a particular sound quality, as described in greater detail below in conjunction with FIG. 1C.

Figure 1C:
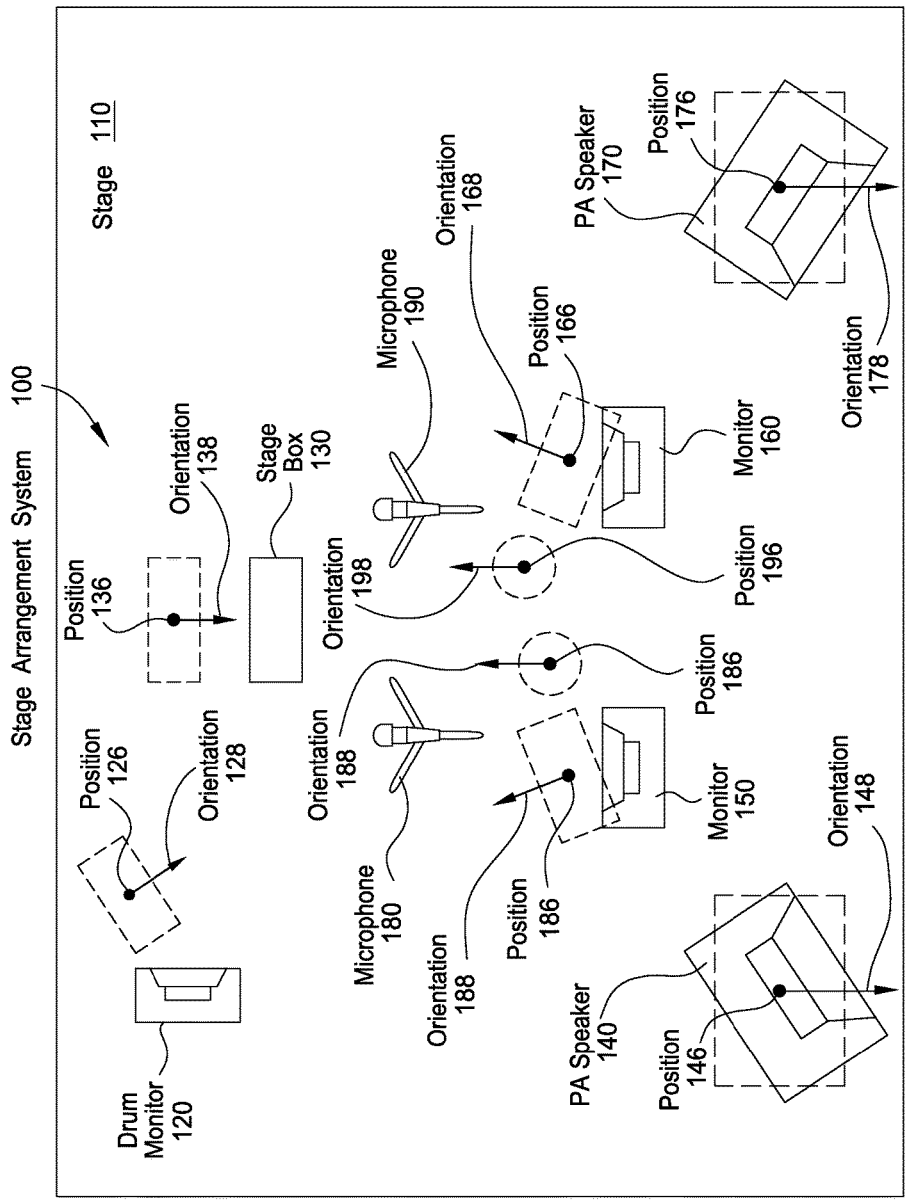

FIG. 1C illustrates updated positions and orientations that stage arrangement system 100 of FIGS. 1A-1B generates when rearranging the elements of stage 110, according to various embodiments. As shown, position 126 and orientation 128 correspond to drum monitor 120, position 136 and orientation 138 correspond to stage box 130, position 146 and orientation 148 correspond to PA speaker 140, position 156 and orientation 158 correspond to monitor 150, position 166 and orientation 168 correspond to monitor 160, position 176 and orientation 178 correspond to PA speaker 170, position 186 and orientation 188 correspond to microphone 180, and position 196 and orientation 198 correspond to microphone 190.

The new positions and orientations shown in FIG. 1C represent a new arrangement for the stage elements on stage 110. This new arrangement may allow those stage elements to produce greater sound quality compared to the previous arrangement shown in FIG. 1B. Among other things, the new arrangement may reflect the preferences of performers that would use those elements, preferences of the stage crew responsible for stage 110, preferences of other performers who have performed on stage 110 previously, or a default set of preferences, as described below in conjunction with FIGS. 8-10. In addition, the arrangement shown in FIG. 1C may be calibrated based on audio feedback captured from the stage elements on stage 110, as described below in conjunction with FIGS. 11-13. The arrangement shown in FIG. 1C may also be implemented in order to reduce feedback, as described in greater detail below in conjunction with FIGS. 14A-16.

Persons skilled in the art will understand that the particular set of stage elements shown in FIGS. 1A-1B along with the corresponding positions and orientations shown in FIGS. 1B-1C constitute exemplary arrangements of those stage elements that are not meant to limit the scope of the invention. As a general matter, the techniques described herein may be applied to any set of stage elements to (i) localize those elements and (ii) achieve any particular arrangement.

FIGS. 2A-2B illustrate the stage arrangement system of FIGS. 1A-1C configured to localize the plurality of stage elements relative to a central location, according to various embodiments.

In FIG. 2A, stage arrangement system 100 localizes the plurality of stage elements on stage 110 relative to stage box 130. As shown, drum monitor 120 is configured to establish communication link 220 with stage box 130, PA speaker 140 is configured to establish communication link 240 with stage box 130, monitor 150 is configured to establish communication link 250 with stage box 130, monitor 160 is configured to establish communication link 260 with stage box 130, PA speaker 170 is configured to establish communication link 270 with stage box 130, microphone 180 is configured to establish communication link 280 with stage box 130, and microphone 190 is configured to establish communication link 290 with stage box 130. In operation, a computing device 102 within each stage element is configured to establish a communication link with a computing device within stage box 130, although those computing devices have not been shown here for the sake of simplicity.

Stage arrangement system 100 may rely on the communication links shown in FIG. 2A in order to determine the position and/or orientation of each stage element relative to the position and/or orientation of stage box 130. For example, and without limitation, drum monitor 120 could establish communication link 220 in order to determine position 122 and orientation 124 of drum monitor 120 relative to position 132 and orientation 134 of stage box 130. Each communication link shown could be implemented via any technically feasible type of signal, including radio signals, acoustic signals, optical signals, and so forth, without limitation. In addition, each such link could constitute multiple signals emanating from different sources on a given stage element. For example, drum monitor 120 could include two or more acoustic sources configured to generate different portions of communication link 220. Stage box 130 could detect those different portions and triangulate position 122 and orientation 124. Stage arrangement system 100 may also include a sensor system configured to directly identify the position and/or orientation of each stage element (i.e. without explicitly communicating with those stage elements), as described below in conjunction with FIG. 2B.

In FIG. 2B, stage arrangement system 100 relies on a sensor 200 to determine the position and orientation of each stage element on stage 110 by detecting tags coupled to those stage elements. As shown, drum monitor includes a tag 222, PA speaker 140 includes a tag 242, monitors 150 and 160 includes tags 252 and 262, respectively, PA speaker 170 includes tag 272, and microphones 180 and 190 include tags 282 and 292, respectively. Sensor 200 is configured to record sensor data within a sensor field 202 and to identify tags within that sensor field. A computing device 102 associated with stage arrangement system 100 then analyzes that sensor data to determine the position and orientation of each such tag and, thus, the position and orientation of each stage element to which a tag is coupled. Sensor 200 could be part of any technically feasible type of data capture system, including, for example, an optical data capture system such as an OptiTrack® system, without limitation. As a general matter, sensor 200 could include, e.g. radio sensors, acoustic sensors, optical sensors, and other types of sensors, without limitation.

Referring generally to FIG. 2A-2B, stage arrangement system 100 may implement either or both of the techniques described in those Figures in order to localize each stage element relative to a central location, be it stage box 130 or sensor 200. Stage arrangement system 100 may also rely on more than one location for localization purposes, as described in greater detail below in conjunction with FIGS. 3A-3B.

FIGS. 3A-3B illustrate the stage arrangement system of FIGS. 1A-1C configured to localize the plurality of stage elements relative to various decentralized locations, according to various embodiments.

In FIG. 3A, stage arrangement system 100 of FIGS. 1A-1C localizes the plurality of stage elements relative to a set of markers. As shown, stage 110 includes markers 300, 302, 304, and 306. Each marker is positioned at a different corner of stage 110. The stage elements on stage 110 are configured to detect one or more of markers 300, 302, 304, and 306 and to determine a position and orientation relative to those markers. In doing so, a computing device 102 within a given stage element may receive signals from one or more of markers 300, 302, 304, and 306 and process those signals to determine a distance and/or angle between the stage element and those markers.

For example, and without limitation, microphone 190 may includes a computing device 102 configured to receive a signal 301 and to determine, based on that signal, that microphone 190 resides at position 192 with orientation 194. Likewise, PA speaker 170 could rely on computing device 102-5 shown in FIG. 1A to process signals 303 and 305 received from markers 303 and 305, respectively, and to determine (e.g., using triangulation) that PA speaker 170 resides at position 172 with orientation 174, without limitation. Signals 301, 303, and 305 could be optical signals generated by or reflected by markers 302 and 306, acoustic signals produced by those markers, or other types of detectable signals, without limitation. The plurality of stage elements could also perform a localization process relative to one another, as described in greater detail below in conjunction with FIG. 3B.

In FIG. 3B, the stage elements of stage 110 establish an ad-hoc network to perform localization relative to one another. As shown, the ad-hoc network is formed by communication links 310, 312, 314, 316, 318, 320, 322, 324, and 326 that may be established between stage elements. For example, drum monitor 120 (i.e., computing device 102-0 within drum monitor 120) is configured to establish communication links 310 and 312 with PA speaker 140 and microphone 180. The other communication links may be established between stage elements in the fashion shown in FIG. 3B.

Any technically feasible type of signal may implement the aforementioned communication links. For example, and without limitation, a given communication link could be implemented by an acoustic signal, a radio signal, an optical signal, and so forth. Each stage element is configured to negotiate one or more communication links with neighboring stage elements in order to exchange position and orientation information with those neighboring elements. With this approach, each such stage element may perform a localization process relative to neighboring stage elements and then effect position and orientation changes to assume different arrangements. In further embodiments, the aforementioned techniques may be practiced without establishing communication links per se. In particular, the ad-hoc network described above could be generated, for example, via unidirectional links or other data signals that do not explicitly enable bidirectional communication.

Referring generally to FIGS. 2A-3B, the techniques described in those Figures reflect exemplary approaches to performing a localization process relative to a central location or multiple decentralized locations, and are not meant to limit the scope of the invention. As a general matter, stage arrangement system 100 may implement any technically feasible approach to determining the position and orientation of the stage elements on stage 110.

Once localized, the stage elements on stage 110 may effect position and orientation changes either indirectly or directly. Specifically, those elements may simply indicate position and orientation changes that should be made (e.g., by a stage hand or other manual laborer, without limitation) as described below in conjunction with FIGS. 4A-4D. Alternatively, those elements may autonomously perform a repositioning/reorienting process, as described in greater detail below in conjunction with FIGS. 5A-5B.

Figure 4B:
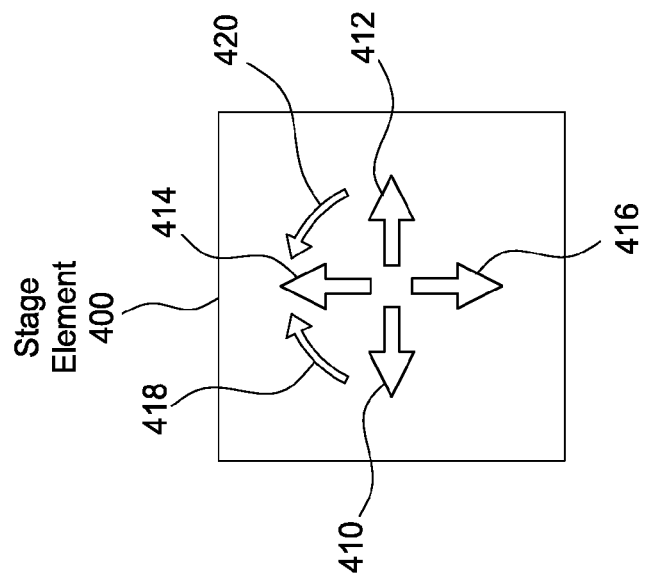
FIGS. 4A-4B illustrate indicators coupled to a stage element and configured to provide position and orientation information according to which the stage element may be arranged, according to various embodiments.
Figure 4A:
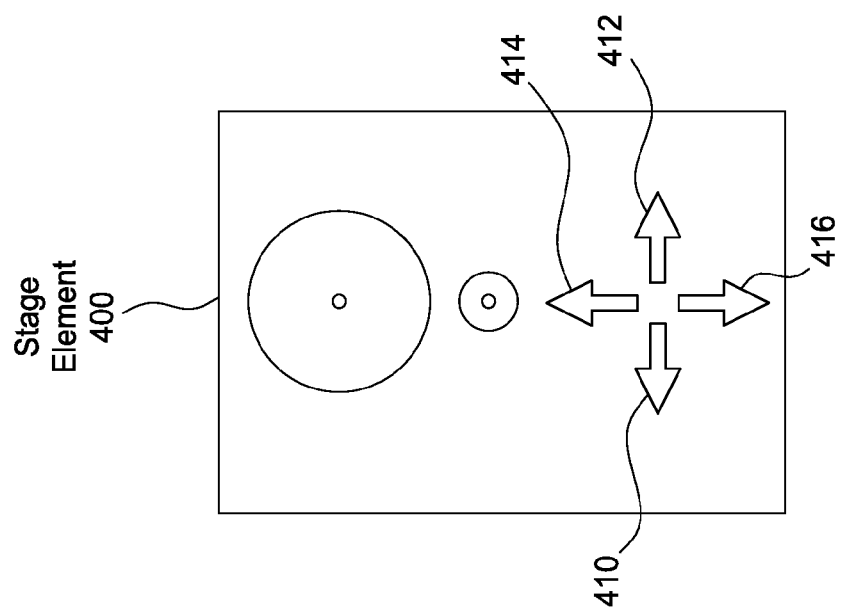

FIGS. 4A-4B illustrate indicators coupled to a stage element and configured to provide position and orientation information according to which the stage element may be arranged, according to various embodiments.

In FIG. 4A, a stage element 400 includes indicators 410, 412, 414, and 416 coupled to the front of stage element 400. Stage element 400 may be any of the stage elements show on stage 110 in FIGS. 1A-3B. Indicators 410, 412, 414, and 416 provide instructions for positioning and/or orientating stage element 400. Indicators 410, 412, 414, and 416 could be, e.g. light-emitting diodes (LED) or another type of luminescent device, without limitation. Stage arrangement system 100 is configured to effect position changes to stage element 400 by illuminating one or more of the indicators coupled to that element. A stagehand or other manual laborer may then physically rearrange stage element 400 according to those instructions. For example, indicator 410 could indicate that stage element 400 should be moved to the left, while indicator 414 could indicate that stage element 400 should be moved back, without limitation.

In FIG. 4B, indicators 410, 412, 414, and 416 are coupled to the top of stage element 400, along with indicators 418 and 420. Stage arrangement system 100 may effect position changes using indicators 410, 412, 414, and 416 in the fashion described in conjunction with FIG. 4A. In addition, stage arrangement system 100 is configured to effect orientation changes to stage element 400 by illuminating one or more of indicators 418 and 420. For example, indicators 418 could indicate that stage element 400 should be rotated clockwise, while indicator 420 could indicate that stage element 400 should be rotated counterclockwise, without limitation.

Figure 4D:
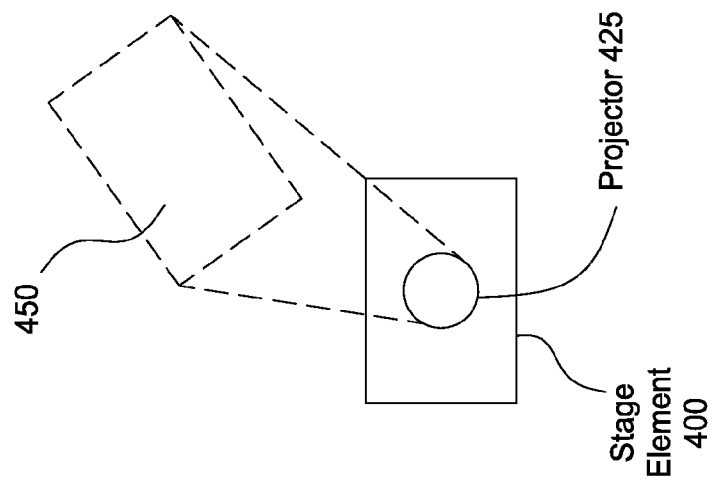
FIGS. 4C-4D illustrate images projected by a stage element according to which the stage element may be arranged, according to various embodiments.
Figure 4C:
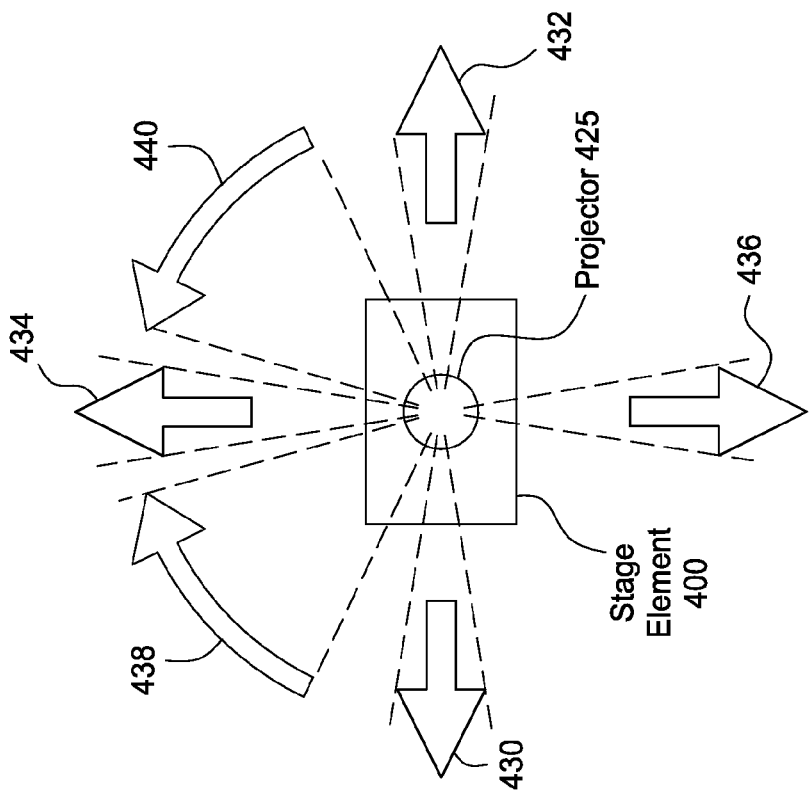

FIGS. 4C-4D illustrate images projected by stage element 400 according to which the stage element may be arranged, according to various embodiments.

In FIG. 4C, stage element 400 is configured to project position indicators 430, 432, 434, and 436, as well as orientation indicators 438 and 440. Stage element 400 includes an image projector 425 capable of generating and projecting images onto stage 110. Image projector 425 could be a laser projector or other optical device, for example, and without limitation. Position indicators 430, 432, 434, and 436 may provide similar instructions as indicators 410, 412, 414, and 416, respectively, described in conjunction with FIGS. 4A-4B. In addition, orientation indicators 438 and 440 may provide similar instructions as indicators 418 and 420, respectively, described in conjunction with FIG. 4B. Based on the directives provided by the indicators shown in FIG. 4C, a stagehand or other manual laborer may position and orient stage element 400.

In FIG. 4D, projector 425 is configured to project an outline 450 of the precise position and orientation where stage element 400 should be positioned. Outline 450 may have a similar size and shape as a cross-section of stage element 400, so that a stagehand or manual laborer need only place stage element 400 substantially within outline 450 in order to position that element.

Referring generally to FIGS. 4A-4D, stage element 400 may be repositioned by a stagehand or manual laborer in response to the instructions provided by the various types of indicators discussed therein. As stage element 400 is physically moved, the instructions provided by those various indicators may be updated based on the current position and orientation of stage element 400 in real time. For example, as stage element 400 shown in FIG. 4D is moved towards outline 450, projector 425 could adjust outline 450 to account for the motions of stage element 400. Accordingly, outline 450 would appear static relative to stage 110 despite motions associated with projector 425. Once stage element 400 has been repositioned or reoriented to the location determined by stage arrangement system 100, the indicators discussed herein may be deactivated or may indicate that a successful placement has occurred. A stage element on stage 110 may also autonomously perform a repositioning and reorientation process, i.e., independent of a stagehand or manual laborer, as described below in conjunction with FIG. 5A-5B.

FIGS. 5A-5B illustrate various mechanical actuators coupled to a stage element and configured to cause the stage element to move to a new position and/or orientation, according to various embodiments.

In FIG. 5A, a stage element 500 includes a carriage 510 configured to roll stage element 500 between different positions and orientations. Stage element 500 may be any of the stage elements show on stage 110 in FIGS. 1A-3B. Carriage 510 may include wheels, treads, legs, or other mechanical protrusions configured to provide stage element 500 with locomotive capabilities. When stage arrangement system 100 localizes stage element 500, and then determines a new position and/or orientation for that stage element, a computing device within stage element 500 may transmit control signals to carriage 510 in order to perform a repositioning and/or reorienting process.

In one embodiment, stage element 500 does not include mechanical protrusions configured to induce motion, and instead relies on other non-protrusive approaches. For example, stage element 500 could include a low-friction bottom surface configured to easily slide across stage 110. Magnets under stage 110 could push or pull stage element 500, thereby inducing motion. Alternatively, stage element 500 could include micro-propulsion devices to apply acceleration and deceleration forces to stage element 500.

In FIG. 5B, stage element 500 includes a vibration actuator 520 configured to move stage element 500 between different positions and orientations using vibrations. Unlike carriage 510 described above, vibration actuator 520 may be entirely self-contained and need not include mechanical protrusions. Instead, vibration actuator 520 may include internal gyroscopic elements (none shown) configured to induce vibrations that cause stage element 500 to move in a controlled manner. Alternatively, vibration actuator 520 may include one or more linear motors configured to accelerate, and then rapidly decelerate, a mass of any given size, thereby inducing a "jumping" motion in one or more directions. In practice, the kinetic energy of the mass is transferred into stage element 500, thereby causing stage element 500 to lurch forward.

Referring generally to FIGS. 5A-5B, the techniques described in those Figures are provided for exemplary purposes only in order to illustrate different approaches for autonomously repositioning and reorienting a stage element. Persons skilled in the art will understand that other techniques are equally applicable to the present invention, and that any technically feasible approach to autonomously moving an object falls within the scope of the present invention.

FIGS. 1A-5B are meant to illustrate, by way of example, the generic functionality of stage arrangement system 100. As mentioned above, that functionality includes a localization procedure and a repositioning/reorienting procedure. The overall process for rearranging the elements of stage 110 is described in stepwise fashion below in conjunction with FIG. 6.

Figure 6:
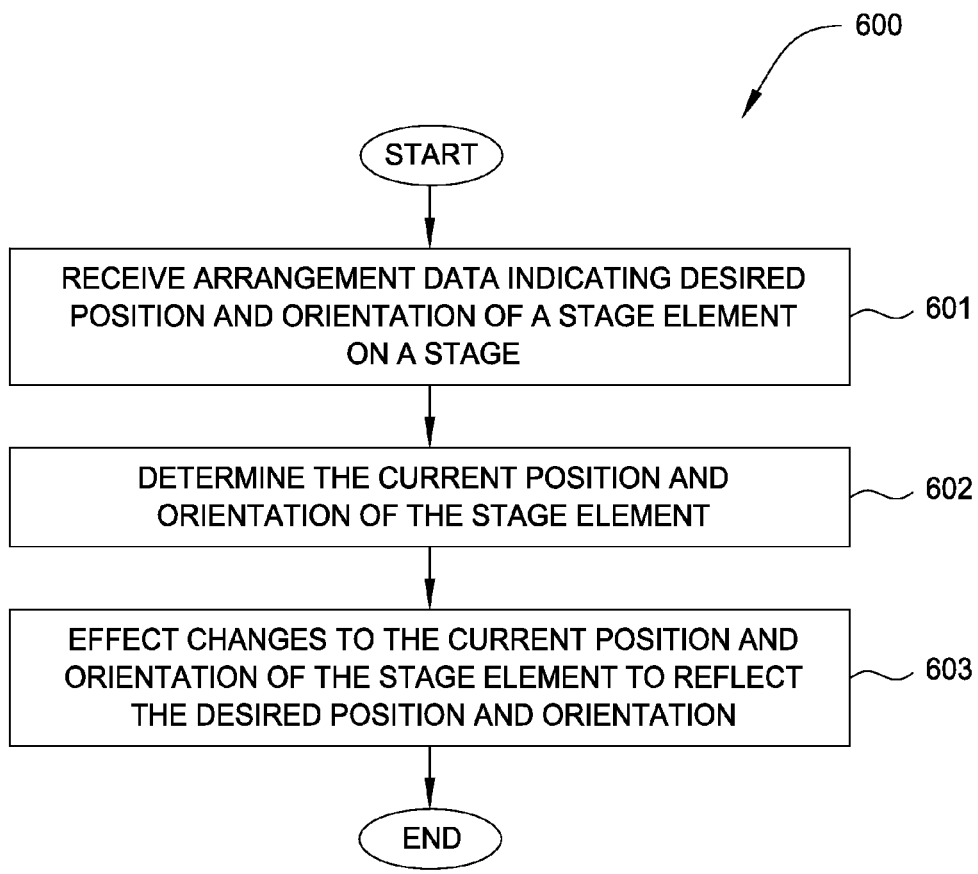
FIG. 6 is a flow diagram of method steps for locating and arranging stage elements on a stage, according to various embodiments.

FIG. 6 is a flow diagram of method steps for locating and arranging stage elements on a stage, according to various embodiments. Although the method steps are described in conjunction with the systems of FIGS. 1-5B, persons skilled in the art will understand that any system configured to perform the method steps, in any order, is within the scope of the present invention.

As shown, a method 500 begins at step 501, where stage arrangement system 100 receives arrangement data indicating a desired position and orientation for a stage element on stage 110. The arrangement data could originate from a wide variety of different sources, including the performers, the venue sponsoring the performance, and so forth, without limitation. At step 502, stage arrangement system 100 determines the current position and orientation of the stage element. Stage arrangement system 100 may localize the stage element relative to a single centralized location (e.g., FIGS. 2A-2B, without limitation). Alternatively, stage arrangement system 100 could localize the stage element relative to one or more decentralized locations (e.g., FIGS. 3A-3B).

At step 503, stage arrangement system 100 effects changes to the current position and orientation of the stage element to reflect the desired position and orientation indicated by the arrangement data received at step 501. In doing so, stage arrangement system 100 could indirectly effect those changes using indicators (e.g., FIGS. 4A-4B, without limitation). Alternatively, stage arrangement system 100 could effect those changes directly (e.g., FIGS. 5A-5B, without limitation).

Any technically feasible device capable of localizing stage elements and effecting arrangement changes for those elements may implement the method 600. For example, computing device 102 (several instances of which are shown in FIG. 1A) may perform the method 600 in order to arrange one or more stage elements. An exemplary instance of computing device 102 is shown in FIG. 7.

Computing Device for Coordinating Stage Element Arrangement

Figure 7:
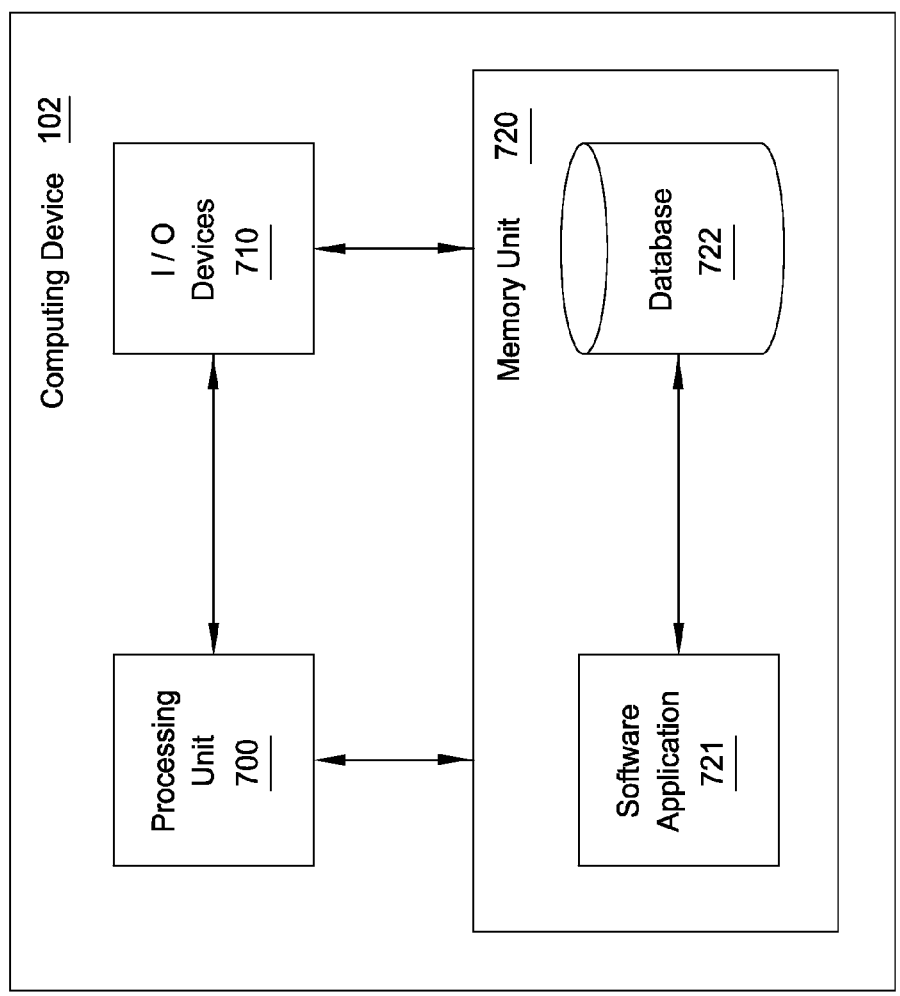
FIG. 7 is a block diagram of a computing device configured to implement one or more aspects of the invention.

FIG. 7 is a block diagram of computing device 102 configured to implement one or more aspects of the invention. As shown, computing device 102 includes a processing unit 700, input/output (I/O) devices 710, and a memory unit 720, coupled together. Memory unit 729 includes a software application 721 coupled to a database 722. Processing unit 700 may be any technically feasible hardware unit configured to process data, including, without limitation, a central processing unit (CPU), a graphics processing unit (GPU), a parallel processing unit (PPU), an application-specific integrated circuit (ASIC), and so forth. Processing unit 700 generally controls the operation of computing device 102, which, in turn, manages the overall functionality of stage arrangement system 100.

I/O devices 710 include devices configured to receive input, such as a keyboard, a mouse, a microphone, an optical sensor, a radio frequency (RF) receiver, and so forth, without limitation. I/O devices 710 also include devices configured to provide output, such as a speaker, an RF transmitter, an indicator such as that shown in FIGS. 4A-4B, a projector such as that shown in FIGS. 4C-4D, a video display, and so forth, without limitation. I/O devices 710 may also include devices configured to both receive input and generate output, such as a touchscreen, a network interface, wireless transceiver, etc., without limitation. I/O devices 710 may include devices capable of establishing local area network (LAN) connections and/or wide area network (WAN) connections, thereby providing connectivity to other devices as well as to the Internet. Memory unit 720 may be any type of readable and/or writable storage media, including a random access memory (RAM), a hard disk, a combination of memory modules, and so forth, without limitation.

Software application 721 includes program code that is executable by processing unit 700 to perform the functionality of stage arrangement system 100 described herein. Software application 721 may read data from and write data to a database 722. The data stored within database 722 may include arrangement data, including position and/or orientation data for stage elements and other localization data, as well as other data needed by stage arrangement system 100.

Generating and Calibrating the Positions and Orientations of Stage Elements

Stage arrangement system 100 is capable of effecting arrangements for the stage elements on stage 110 based on a wide variety of different types of arrangement data. As mentioned, that data could reflect preferences of performers, managers of a venue where stage 110 is located, other performers who have performed on stage 110 in the past, and so forth. Stage arrangement system 100 is configured to acquire arrangement data from these different sources and to combine that data, as described below in conjunction with FIGS. 8-10. Stage arrangement system 100 may then calibrate that data to optimize that arrangement of elements on stage 110 relative to the acoustic qualities associated with stage 110 and the surrounding venue, as described in greater detail below in conjunction with FIGS. 11-13.

Figure 8:
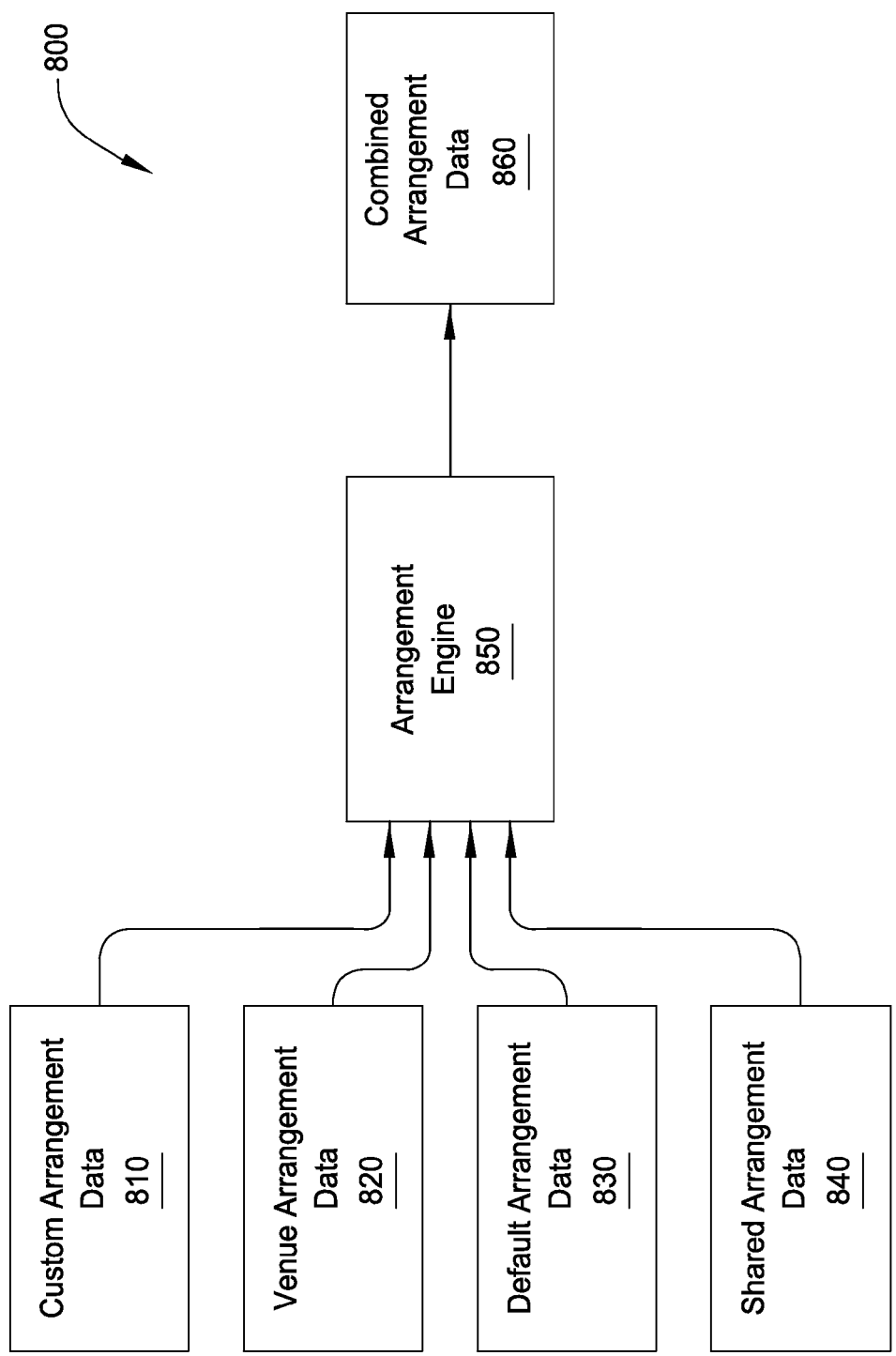
FIG. 8 illustrates various data that are processed by an arrangement engine to generate combined arrangement data, according to various embodiments.

FIG. 8 illustrates various data that are processed by an arrangement engine 850 within stage arrangement system 100 to generate combined arrangement data, according to various embodiments. As shown, arrangement engine 850 receives custom arrangement data 810, venue arrangement data 820, default arrangement data 830, and shared arrangement data 830 and combines those different sets of arrangement data to produce combined arrangement data 860.

Custom arrangement data 810 reflects a preferred arrangement provided by the performers associated with the live event. The performers could have, for example, previously created custom arrangement data 810 based on experience performing at different venues, without limitation. Venue arrangement data 820 represents a particular arrangement for stage 110 provided by the venue where stage 110 is located. The crew of stage 110, for example, could have created venue arrangement data 820 based on experience arranging elements on stage 110, without limitation. Default arrangement data 830 is a standard arrangement that may be selected for the performers according to certain attributes, such as a number of performers, a number of guitars, a number of PA speakers, and so forth, without limitation. Shared arrangement data 840 could be provided by another set of performers or retrieved from a cloud-based repository of arrangement data sets, for example, and without limitation. Arrangement engine 850 is configured to merge some or all of the arrangement data sets described above through any technically approach to merging data, although one exemplary approach is described below in conjunction with FIGS. 9A-9B.

Figure 9A:
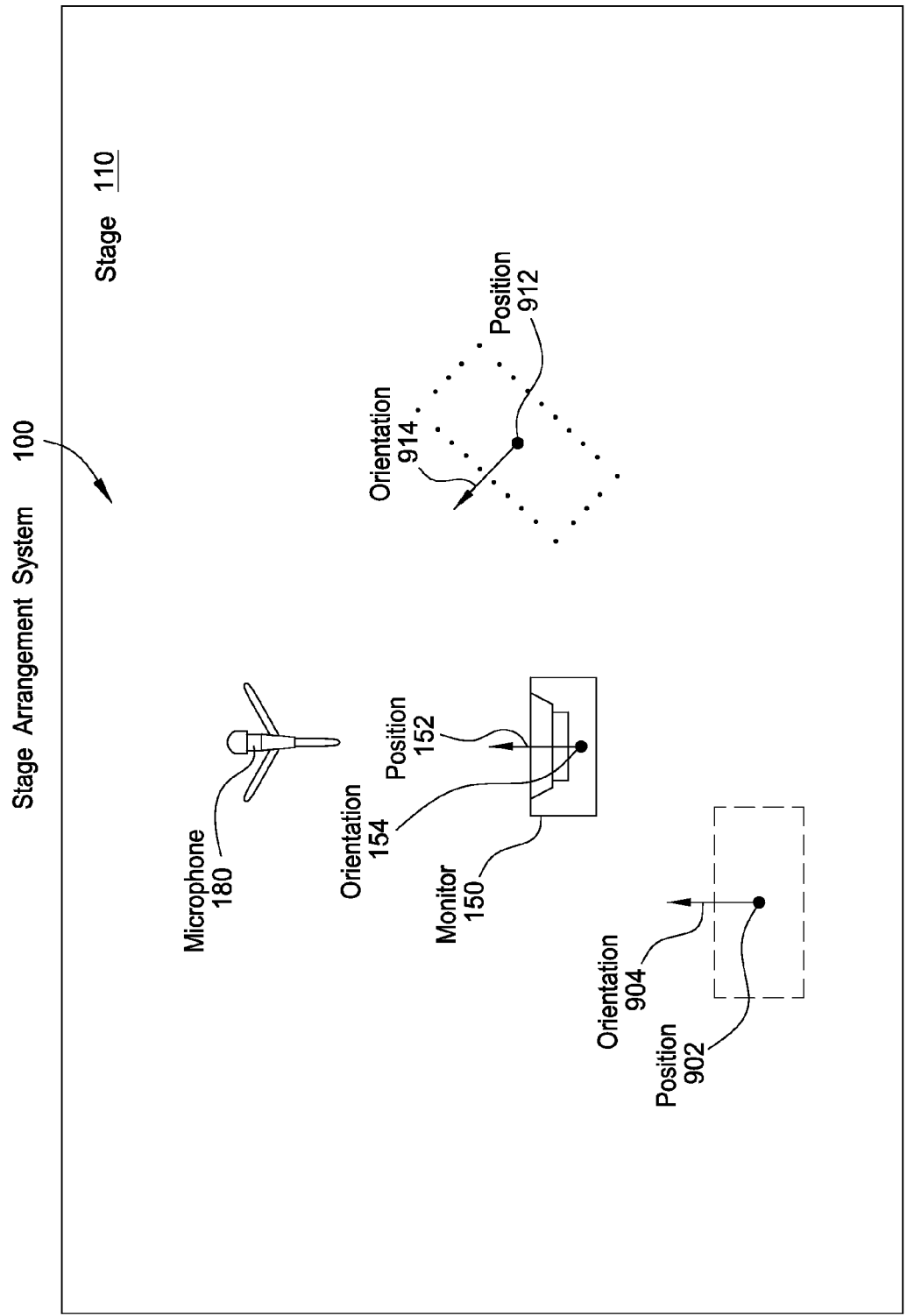
FIG. 9A-9B illustrate an exemplary scenario in which the arrangement engine of FIG. 8 generates combined arrangement data, according to various embodiments.
Figure 9B:
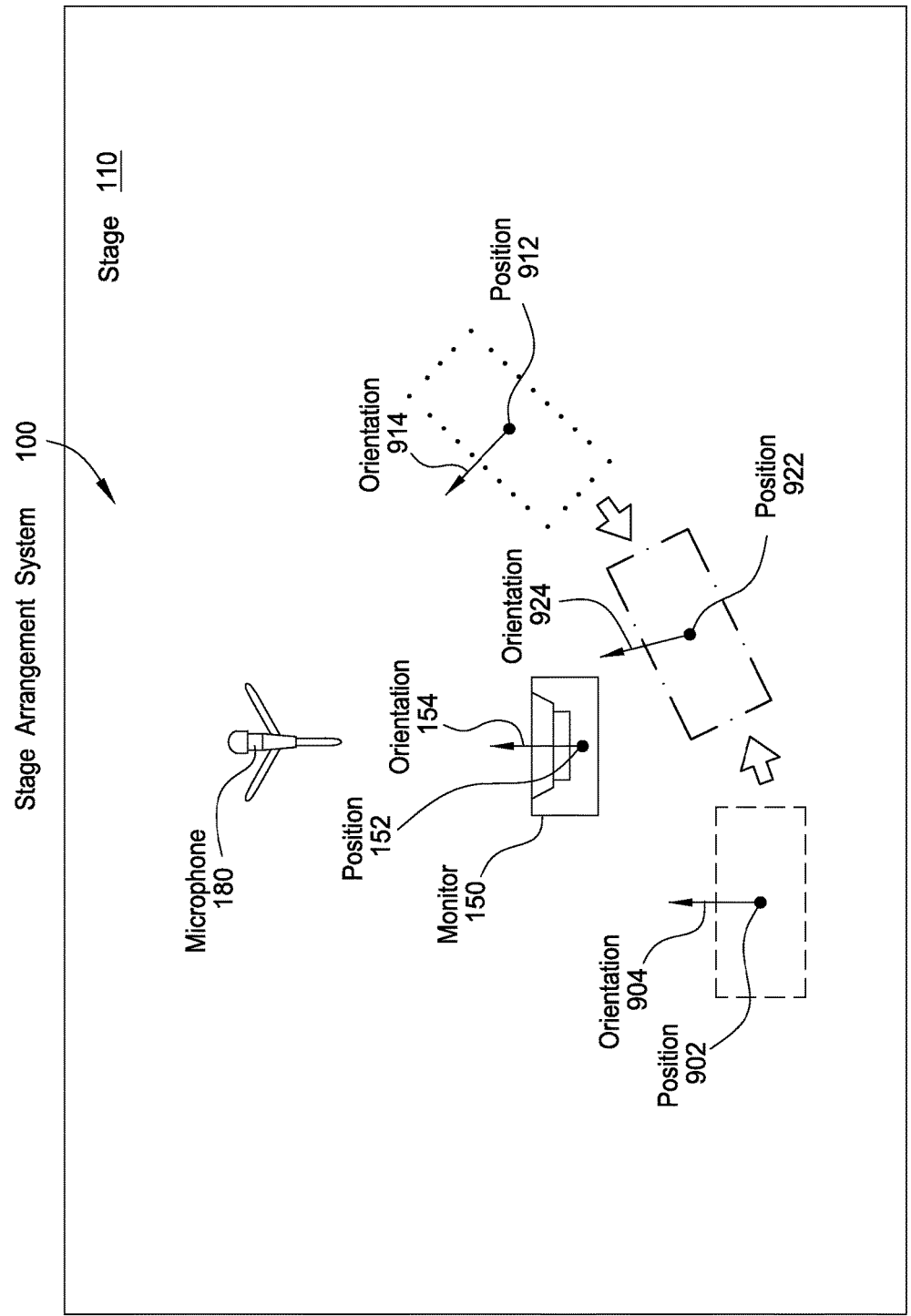

FIG. 9A-9B illustrate an exemplary scenario in which arrangement engine 850 of FIG. 8 generates combined arrangement data 860, according to various embodiments.

As shown in FIG. 9A, monitor 150 resides at position 152 with orientation 154 on stage 110, as also shown in FIG. 1B. A first set of arrangement data could indicate that monitor 150 should reside at position 902 with orientation 904, while a second set of arrangement data could indicate that monitor 150 should reside at position 912 with orientation 914. The first and second sets of arrangement data could be any of the arrangement data sets discussed above in conjunction with FIG. 8, without limitation.

As shown in FIG. 9B, stage arrangement system 100 generates combined arrangement data, based on the first and second sets of arrangement data, indicating that monitor 150 should reside at position 922 with orientation 924. Position 922 is located between positions 902 and 912, while orientation 904 resides at an angle between orientation 940 and 914. Stage arrangement system 100 may generate position 922 and orientation 924 through a wide variety of different techniques. For example, and without limitation, stage arrangement system 100 could average position 902 with position 912 to generate position 922 and average orientation 904 with orientation 914 to generate orientation 924. Persons skilled in the art will understand that the scenario described in conjunction with FIGS. 9A-9B provided for illustrative purposes only and not meant to be limiting. The techniques described above are also discussed in stepwise fashion below in conjunction with FIG. 10.

Figure 10:
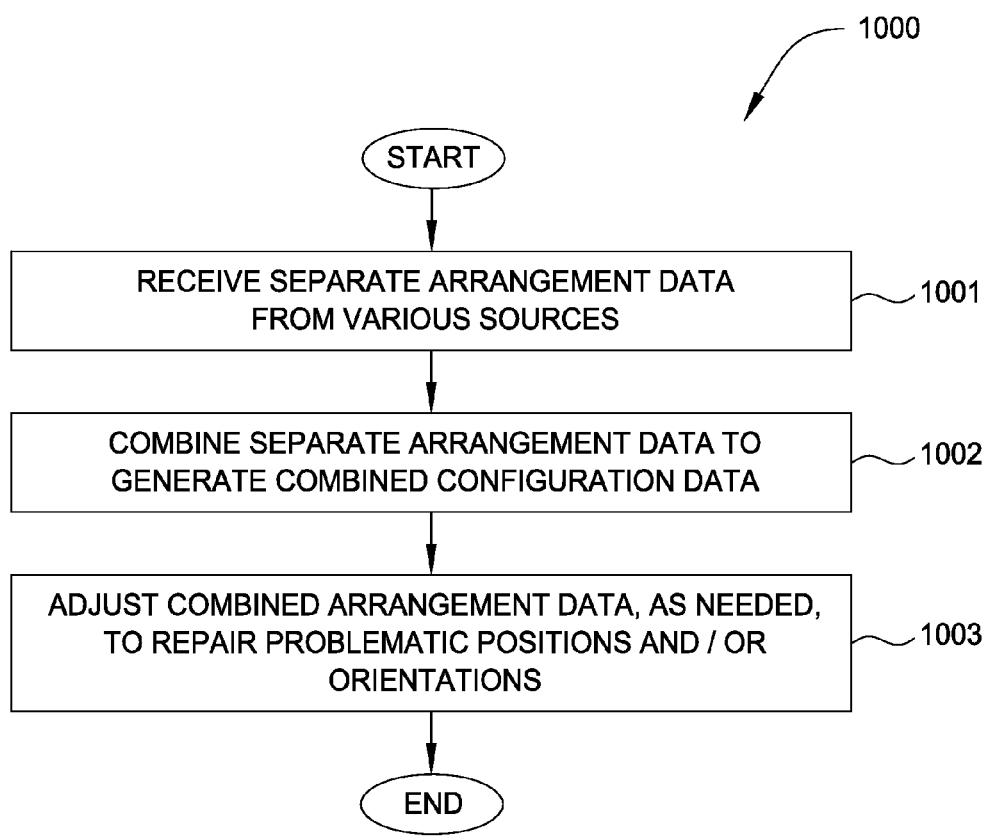
FIG. 10 is a flow diagram of method steps for combining arrangement data, according to various embodiments.

FIG. 10 is a flow diagram of method steps for combining arrangement data, according to various embodiments. Although the method steps are described in conjunction with the systems of FIGS. 1-9B, persons skilled in the art will understand that any system configured to perform the method steps, in any order, is within the scope of the present invention.

As shown, a method 1000 begins at step 1001, wherein stage arrangement system 100 receives different arrangement data from various sources. Stage arrangement system 100 could, for example, receive arrangement data from the performers, the venue, other performers, and so forth, without limitation. Each received set of arrangement data may indicate a different position and orientation for each element of stage 110.

At step 1002, arrangement engine 850 of FIG. 8 combines the arrangement data received at step 801 to generate combined arrangement data 860. For a given stage element, combined arrangement data 860 indicates a position and orientation that is based on the positions and orientations associated with the received arrangement data.

At step 1003, stage arrangement system 100 adjusts the combined arrangement data, as needed, to repair any problematic positions and/or orientation. Such "problematic" positions or orientations could generate feedback, obstruct a view of the performers, and so forth, without limitation. FIGS. 14A-16, described in greater detail below, discuss various approaches for correcting potential feedback issues.

Once arrangement engine 850 has combined the various sets of arrangement data, stage arrangement system 100 may implement a calibration technique in order to fine-tune the arrangement of the stage elements on stage 110 to optimize the sound quality of those elements, as described below.

Figure 11:
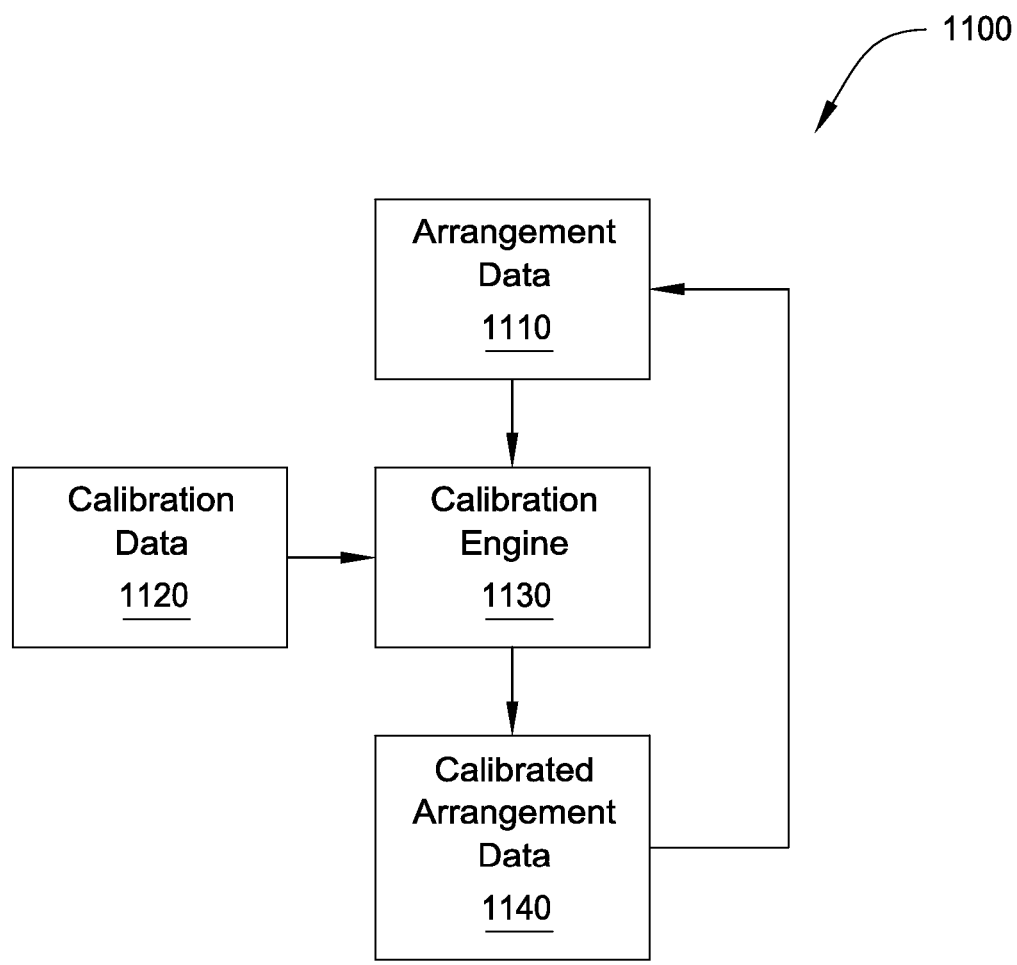
FIG. 11 illustrates various data that are processed by a calibration engine to generate calibrated arrangement data, according to various embodiments.

FIG. 11 illustrates various data that are processed by a calibration engine 1130 within stage arrangement system 100 to generate calibrated arrangement data 1140, according to various embodiments. As shown, calibration engine 1130 receives configuration data 1110 and calibration data 1120 and, based on the received data, generates calibrated arrangement data 1140. Configuration data may represent any of the sets of arrangement data shown in FIG. 8, including, but not limited to, combined arrangement data 860. Calibration data 1120 represents data recorded during a sound test of the stage elements on stage 110 when those elements are arranged according to arrangement data 1110.

Calibration engine 1130 generates calibrated configuration data 1140 by adjusting arrangement data 1140 in order to improve the sound quality of the stage elements on stage 110. Calibration engine 1130 may then update the arrangement of those stage elements, i.e. by effecting position and/or orientation changes in the fashion discussed above, and then re-test those elements to generate new calibration data. Calibration engine 1130 may repeat this process until the sound quality of the elements on stage 110 is acceptable.

The testing procedure implemented by calibration engine 1130 is discussed in greater detail below in conjunction with FIGS. 12A-12B.

Figure 12A:
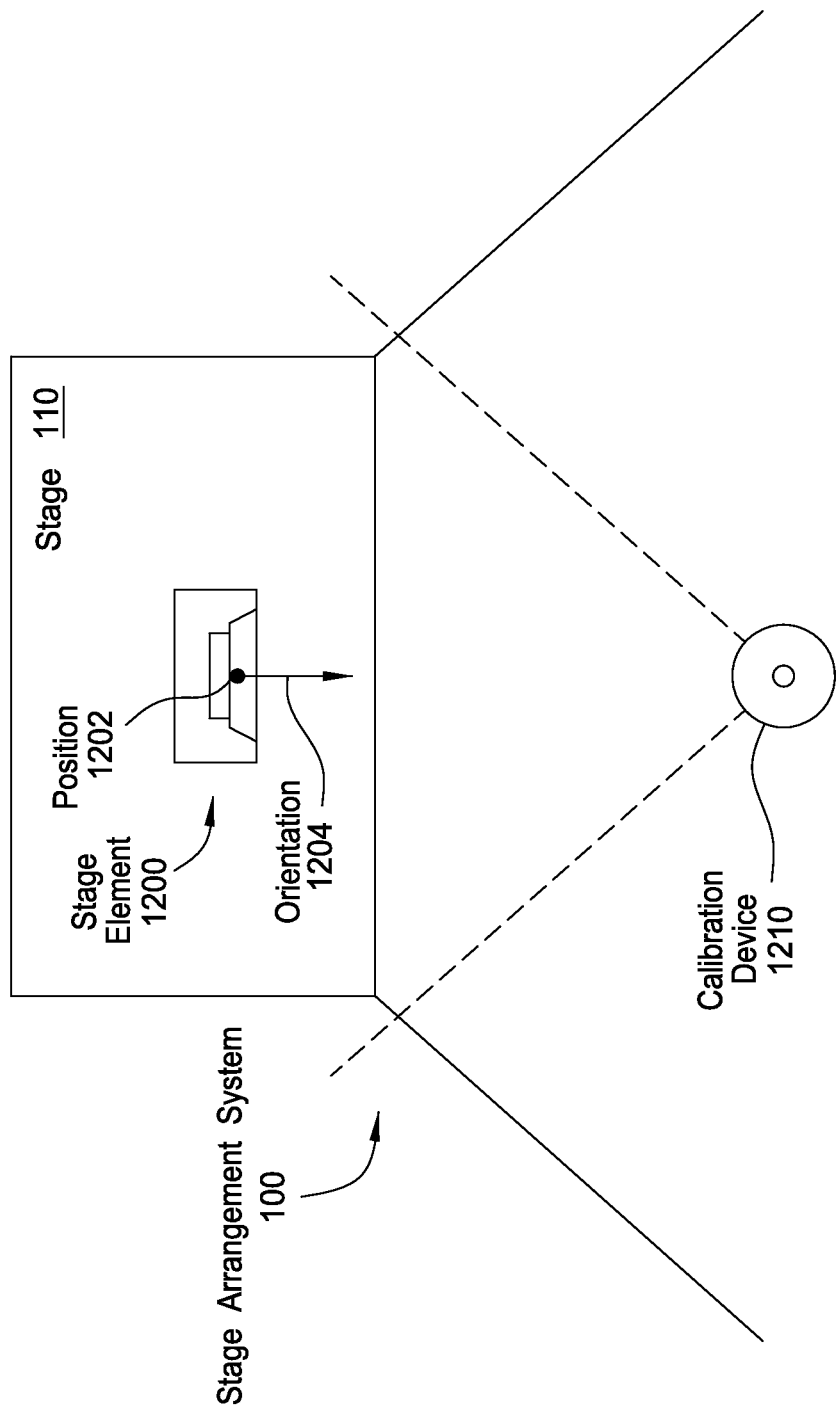
FIGS. 12A-12B illustrate an exemplary scenario in which the calibration engine of FIG. 11 generates calibrated configuration data, according to various embodiments.
Figure 12B:
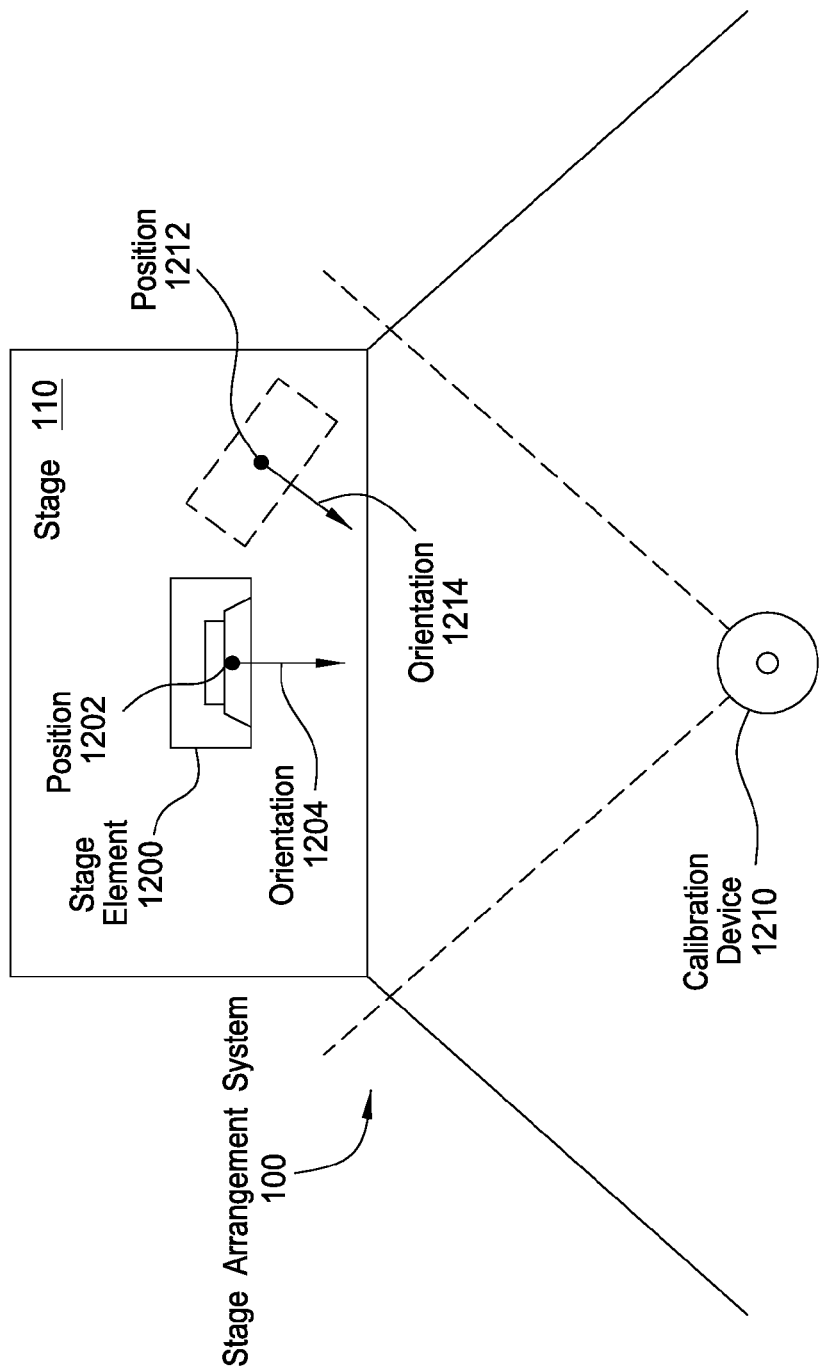

FIGS. 12A-12B illustrate an exemplary scenario in which the calibration engine of FIG. 11 generates calibrated configuration data, according to various embodiments.

In FIG. 12A, a stage element 1200 resides on stage 110 at a position 1202 with an orientation 1204. Position 1202 and orientation 1204 represent the current arraignment of stage element 1200. A calibration device 1210 is located off of stage 110 in order to capture sound test data that may reflect sound experienced by the audience during a performance. Calibration device 1210 could be, for example, and without limitation, a microphone (or array of microphones) or other transduction device. Calibration device 1210 may also include a plurality of microphones distributed over a wide area. In one embodiment, calibration device 1210 is coupled to an unmanned aerial vehicle (UAV) configured to gather sound test data at a variety of locations.

Calibration engine 1130 of FIG. 11 is configured to receive calibration data 1120 gathered by calibration device 1210 during the sound test, and to then update the arrangement of stage element 1200 to improve the sound quality generated by stage element 1200, as described below.

In FIG. 12B, calibration engine 1210 generates calibrated arrangement data that indicates a position 1212 and an orientation 1214. Stage arrangement system 100 may then reposition and/or reorient stage element 1200 to assume position 1212 and orientation 1214, potentially improving the sound quality experienced by the audience during performance.

Figure 13:
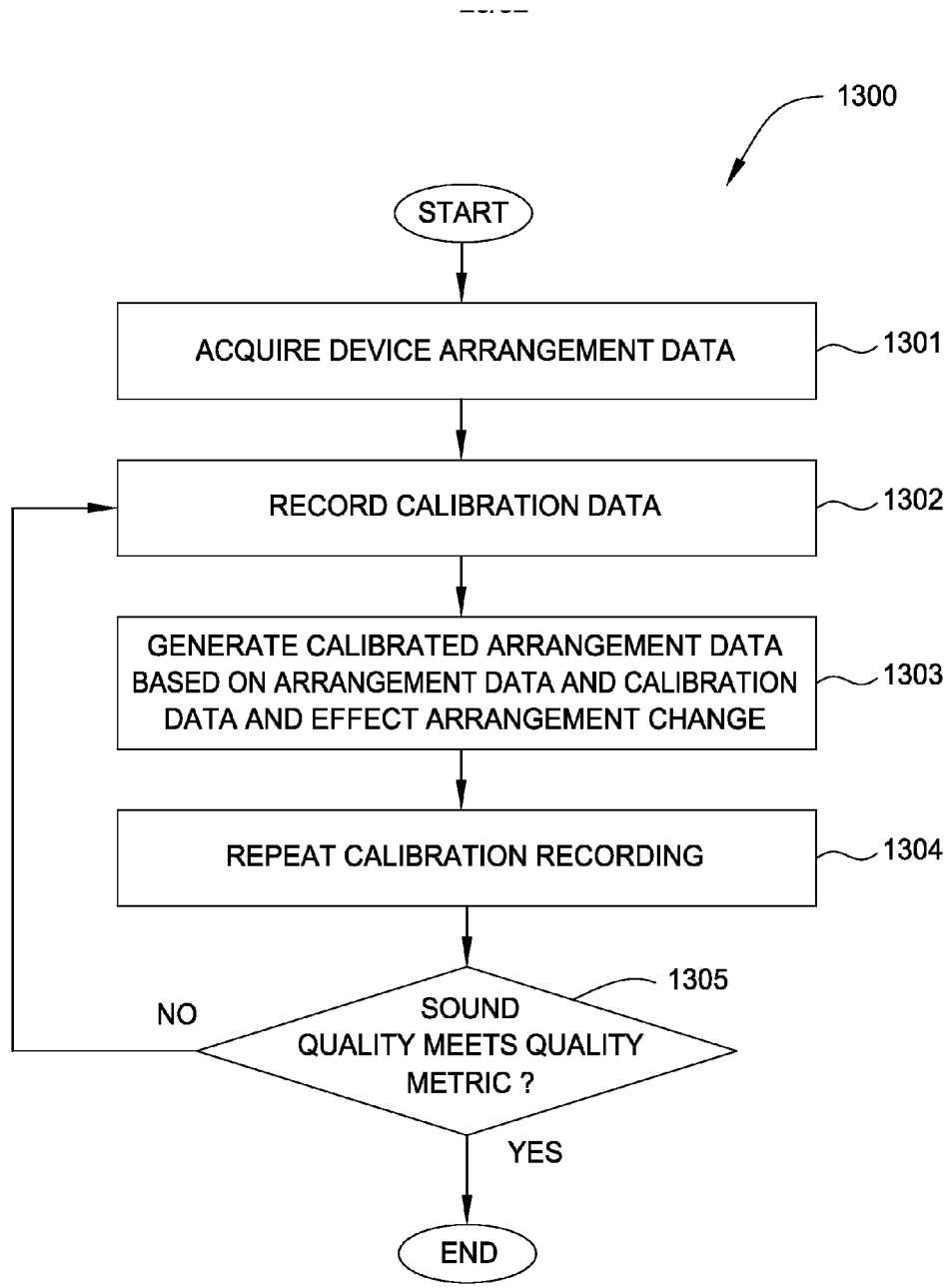
FIG. 13 is a flow diagram of method steps for generating calibrated arrangement data, according to various embodiments.

FIG. 13 is a flow diagram of method steps for generating calibrated arrangement data, according to various embodiments. Although the method steps are described in conjunction with the systems of FIGS. 1-12B, persons skilled in the art will understand that any system configured to perform the method steps, in any order, is within the scope of the present invention.

As shown, a method 1300 begins at step 1301, where calibration engine acquires arrangement data that reflects the current arrangement of the stage elements on stage 110. The arrangement data could have been generated, for example, and without limitation, using the techniques described above on conjunction with FIGS. 8-10.

At step 1302, calibration device 1210 records calibration data during a sound test of the stage elements. In one embodiment, calibration device 1210 may be a microphone coupled to a UAV configured to transduce audio data at a variety of different locations during the sound test.

At step 1303, calibration engine 1130 generates calibrated arrangement data based on the arrangement data acquired at step 1301 and the calibration data recorded at step 1302. The calibrated arrangement data may indicate an arrangement for the stage element that improves sound quality. Calibration engine 1130 also effects an arrangement change based on that arrangement data at step 1303.

At step 1304, calibration engine 1130 repeats the recording of calibration data, similar to step 1302. However, at step 1304 calibration engine 1130 records calibration data that reflects the updated arrangement of elements effected at step 1303.

At step 1305, calibration engine 1140 determines whether the sound quality associated with the updated calibration data meets a quality metric. If the sound quality is insubstantial, then the method 1300 returns to step 1301. Otherwise, the method 1300 ends. As a general matter, any of a human sound engineer, an artificially-intelligent sound engineering system, a musician, a venue director, or other person or automated system determines, at step 1305, whether the quality metric has been met. Calibration engine 1140 within stage arrangement system 100 may implement the method 1300 for each different stage element, and may repeat the method 1300 until the sound quality of the stage element on stage 110 is acceptable.

By implementing the techniques described in conjunction with FIGS. 8-13, stage arrangement system 100 may generate arrangements for the stage elements to reflect multiple different sources, and may then calibrate the arrangement of elements to optimize sound quality.

Rearranging Stage Elements to Reduce the Effects of Feedback

Feedback is a well-known phenomenon that occurs when an input element receives input from an output element and then transduces that input to the output element. In turn, the output element amplifies, and then outputs the received input. That amplified signal is then received by the input element. This cycle is referred to as a feedback loop, and can result in unbounded signal amplification and significant distortion. As a general matter, feedback loops are detrimental to sound quality and should be avoided when stage elements are arranged and activated for use. The stage arrangement system 100 described thus far is configured to identify potential feedback loops and rearrange the elements of stage 110 to prevent such loops from occurring, as described in greater detail below in conjunction with FIGS. 14B-16.

Figure 14A:
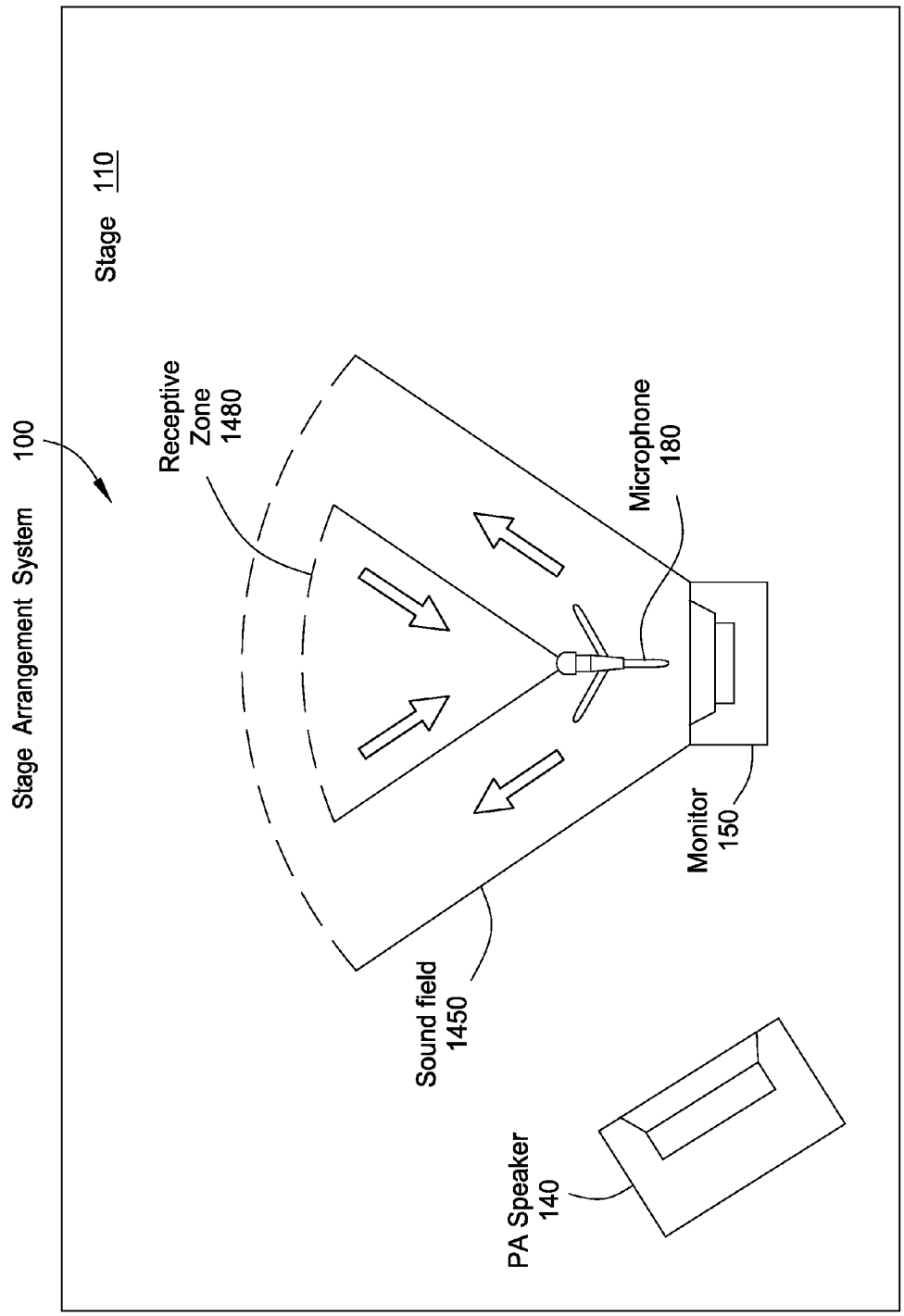
FIGS. 14A-14B illustrate exemplary scenarios in which feedback may occur due to a faulty arrangement of stage elements, according to various embodiments.
Figure 14B:
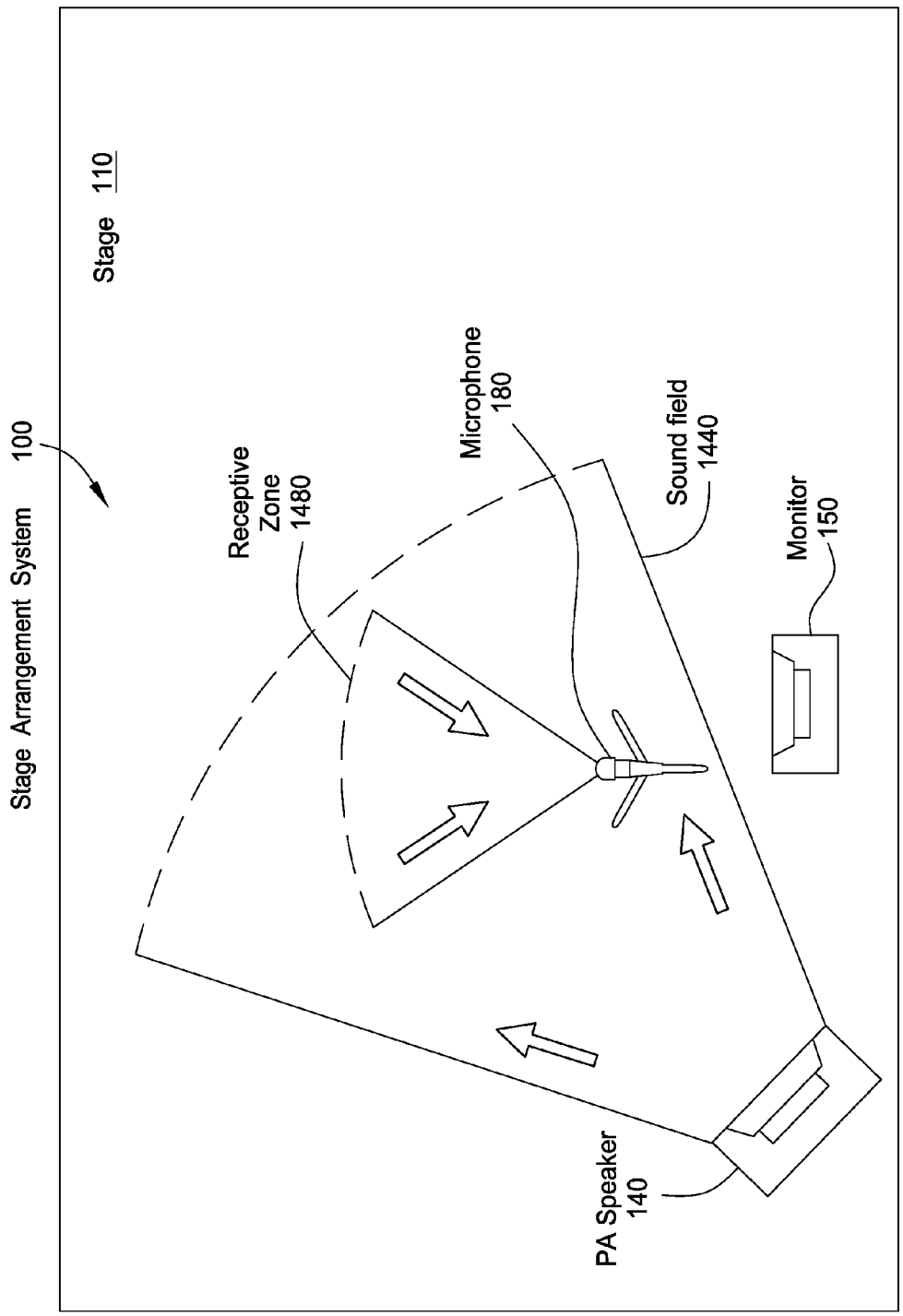

FIGS. 14A-14B illustrate exemplary scenarios in which feedback may occur due to a faulty arrangement of stage elements, according to various embodiments.

As shown in FIG. 14A, microphone 180 resides on stage 110, as also shown in FIGS. 1A-1C, and receives input within a receptive zone 1480. However, monitor 150 resides proximate to microphone 180 and produces output within sound field 1450 that substantially overlaps with receptive zone 1480. When microphone 180 and monitor 150 are activated, microphone 180 receives input from sound field 1450, transduces that input to monitor 150, which then amplifies and outputs the received input within sound field 1450. The particular arrangement of stage elements shown in FIG. 14A causes a feedback loop between microphone 180 and monitor 150.

FIG. 14B illustrates a similar situation whereby PA speaker 140 resides proximate to microphone 180 and produces output within sound field 1440 that substantially overlaps with receptive zone 1480. Similar to above, when microphone 180 and PA speaker 140 150 are activated, microphone 180 receives input from sound field 1440, transduces that input to PA speaker 140, which then amplifies and outputs the received input within sound field 1440. The arrangement of stage elements shown in FIG. 14B reflects another feedback loop.

Referring generally to FIGS. 14A-14B, many such feedback loops may occur between the different input and output elements on stage 110. For example, and without limitation the feedback loops shown in FIGS. 14A and 14B could occur simultaneously. Such feedback loops result due to faulty arrangements of stage elements. Stage arrangement system 100 is configured to identify such faulty arrangements, and to then effect rearrangements to reduce the incidence of feedback. FIG. 15A-15I illustrate various techniques for reducing feedback caused by a faulty arrangement of a generic stage element 1500, according to various embodiments.

Figure 15A:
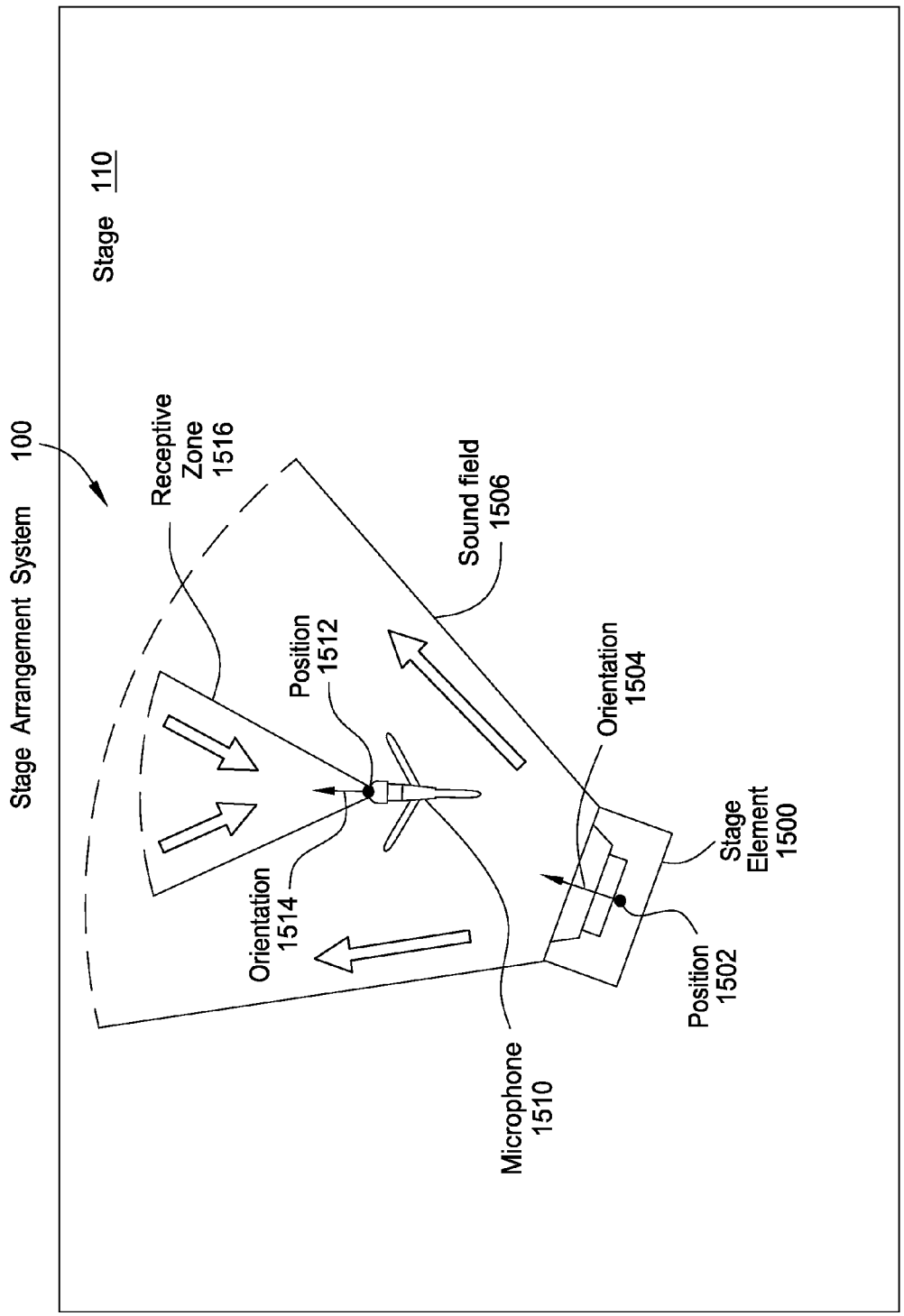
FIG. 15A-15I illustrate various techniques for reducing feedback caused by a faulty arrangement of a stage element, according to various embodiments.

In FIG. 15A, stage element 1500 resides at a position 1502 with an orientation 1504. Stage element 1500 represents a generic stage element configured to produce output, such as PA speaker 140 or monitor 150, among others, without limitation. Stage element 1500 is positioned proximate to a microphone 1510 that resides at a position 1510 with an orientation 1512. Microphone 1510 receives input within receptive zone 1516, which substantially overlaps sound field 1506 associated with stage element 1500. This arrangement of stage elements may cause feedback. Stage arrangement system 100 is configured to detect this feedback-prone arrangement and effect variation arrangement changes to reduce the incidence of feedback between stage element 1500 and microphone 1510, as described below.

Figure 15B:
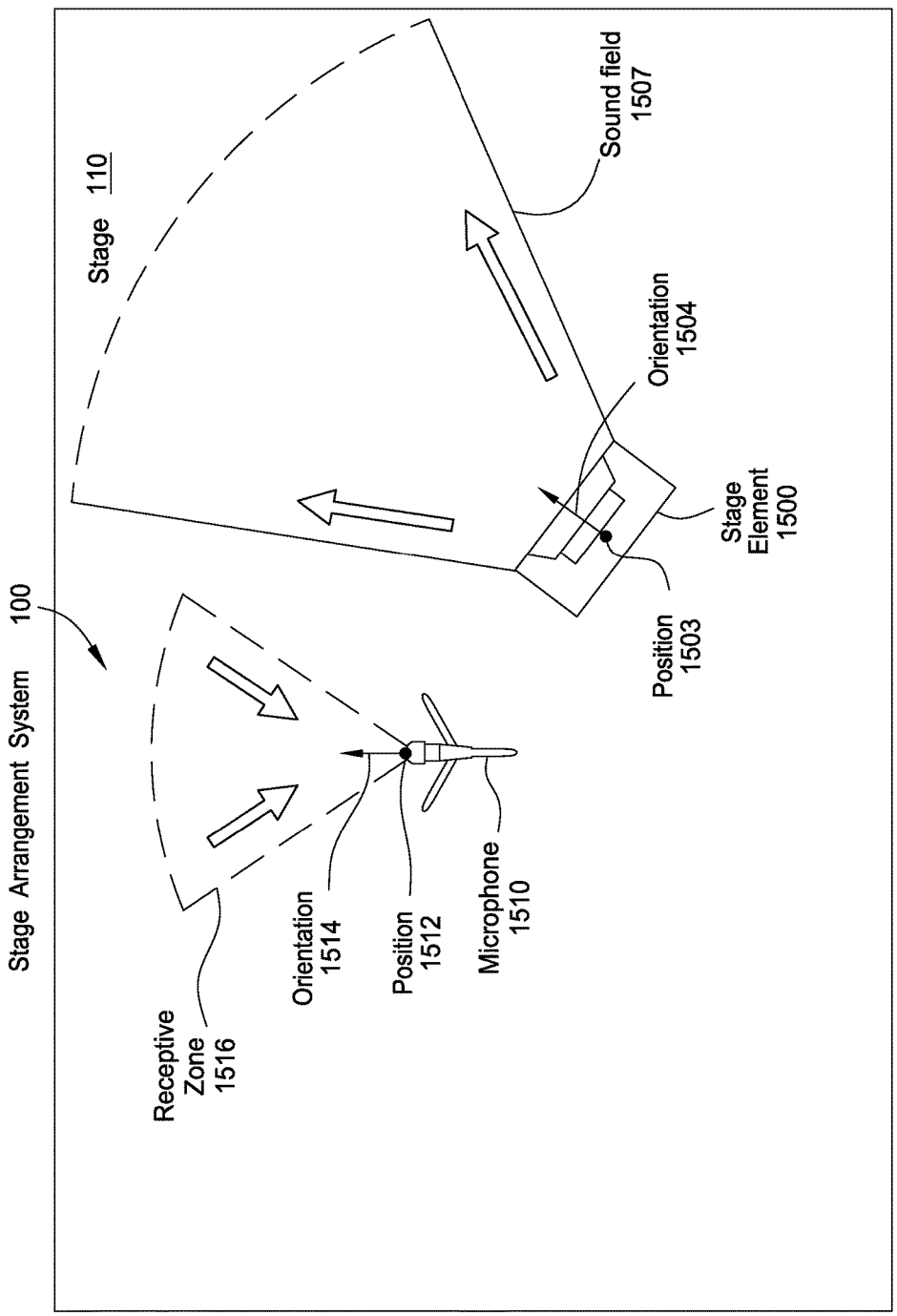

In FIG. 15B, stage arrangement system 100 determines that stage element 1500 should be moved from position 1502 to position 1503 to create sound field 1507 that does not overlap receptive zone 1516. This new arrangement may reduce feedback between stage element 1500 and microphone 1510. Stage element 1500 may retain the original orientation 1502.

Figure 15C:
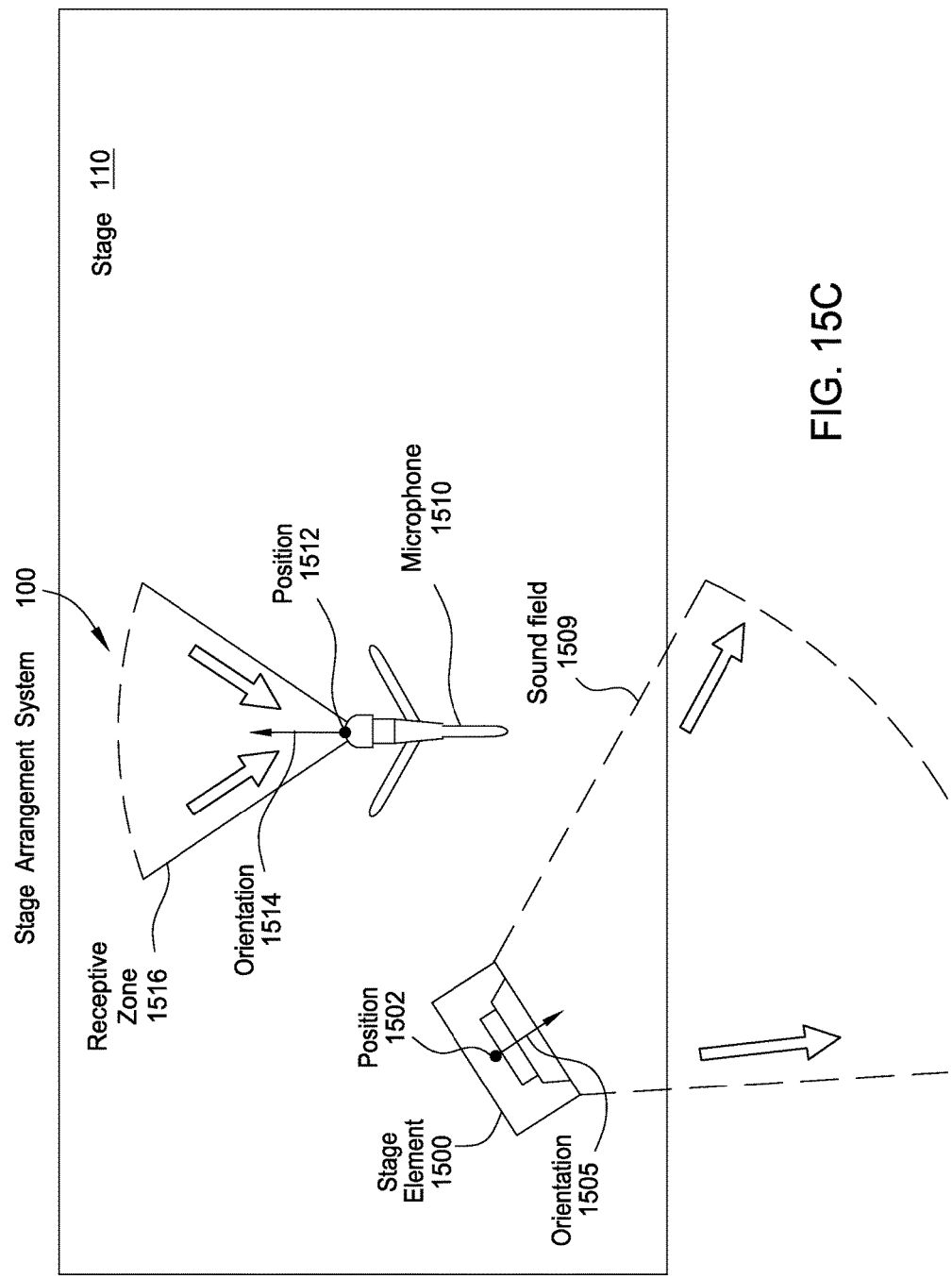

In FIG. 15C, stage arrangement system 100 determines that stage element 1500 should be reoriented from orientation 1504 to orientation 1505 to create sound field 1509 that does not overlap receptive zone 1516. This new arrangement may reduce feedback between stage element 1500 and microphone 1510. Stage element 1500 may retain the original position 1502.

Referring to FIGS. 15B and 15C, persons skilled in the art will recognize that the aforementioned techniques for repositioning and reorienting stage element 1500, respectively, may be combined or practiced separately.

Figure 15D:
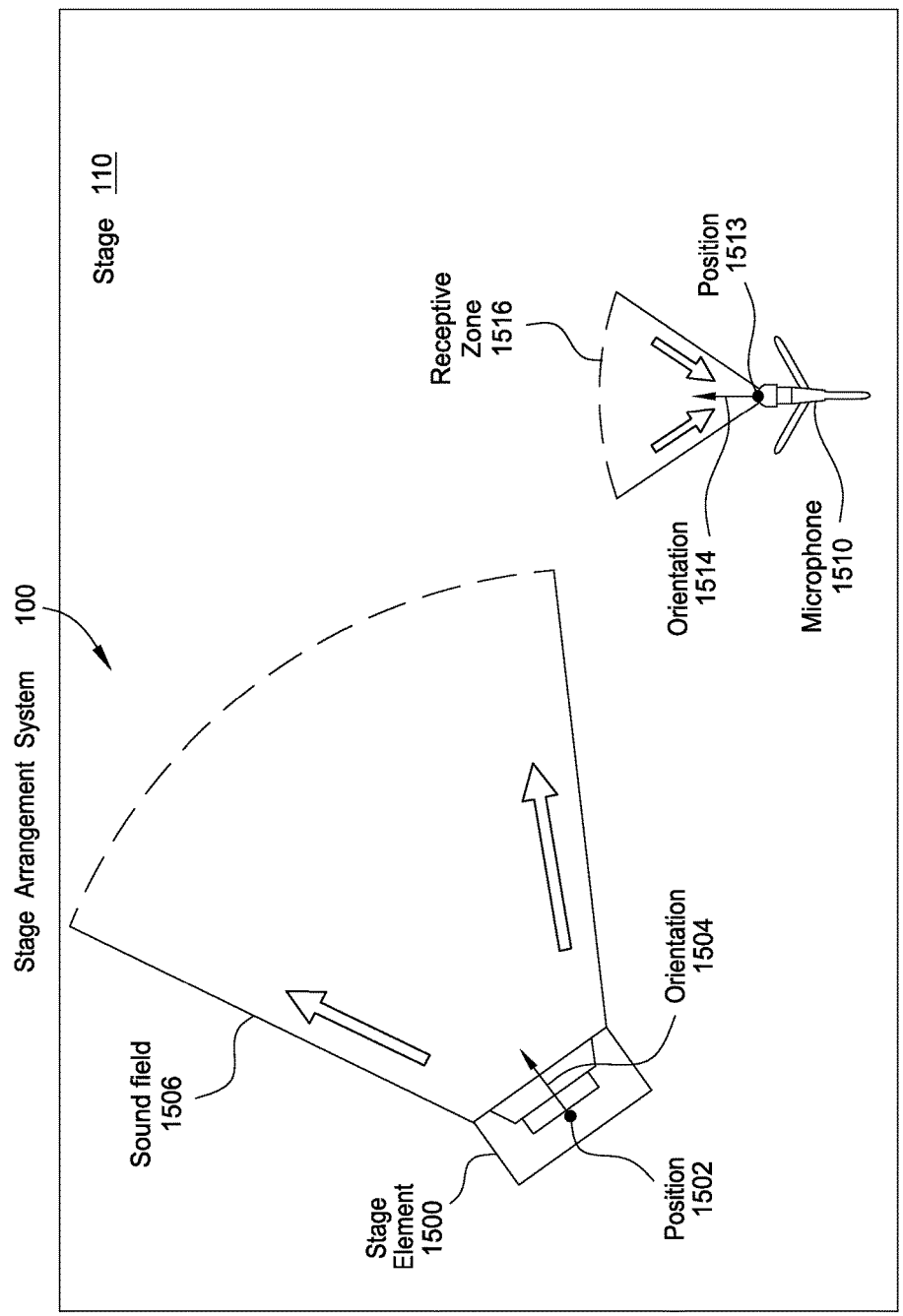

In FIG. 15D, stage arrangement system 100 determines that microphone 1510 should be moved from position 1512 to position 1513 so that sound field 1506 does not overlap new receptive zone 1517. This new arrangement may reduce feedback between stage element 1500 and microphone 1510. Stage element 1500 may retain the original position 1502 and orientation 1504, or assume a new position and/or orientation.

Figure 15E:
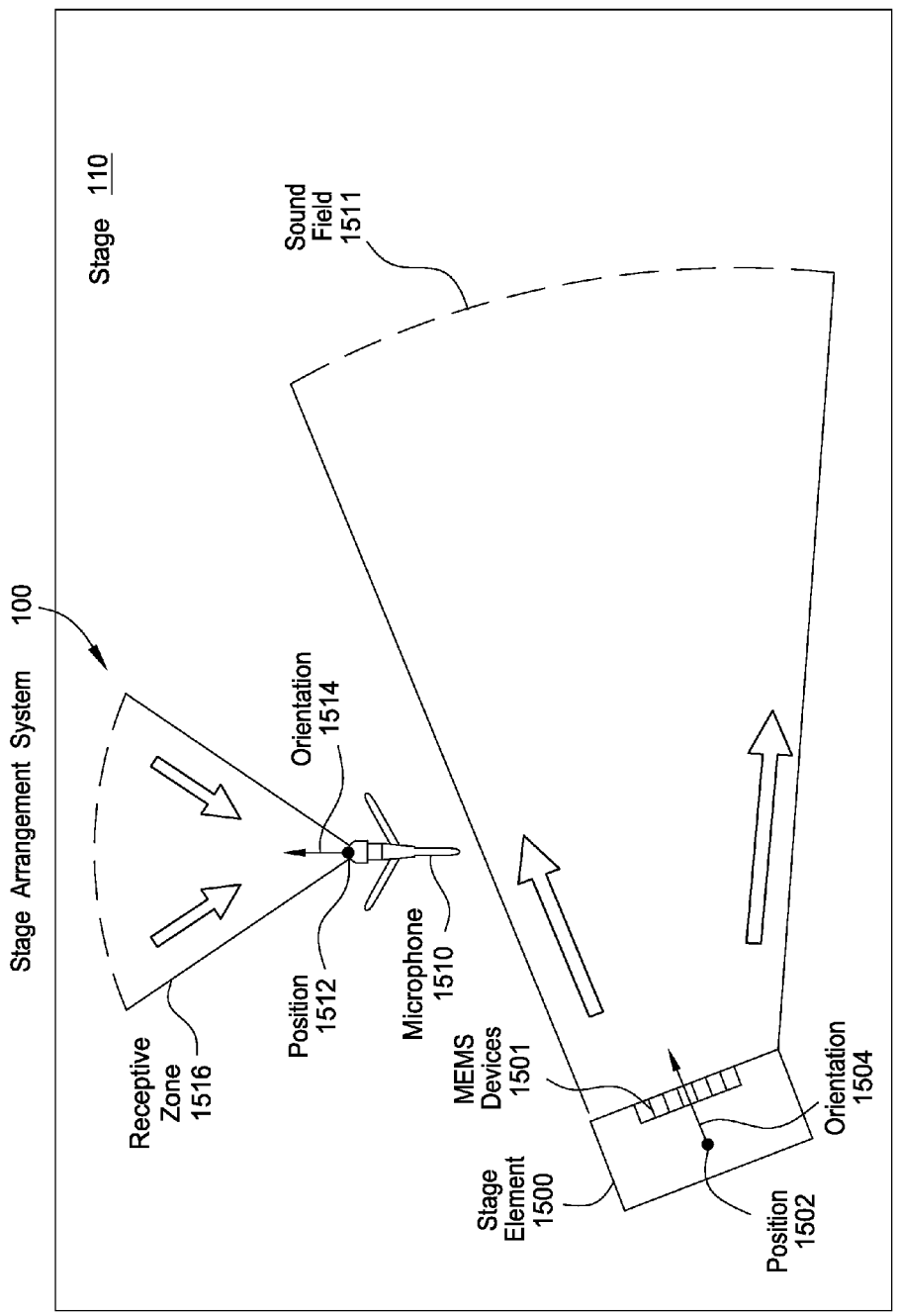
Figure 15F:
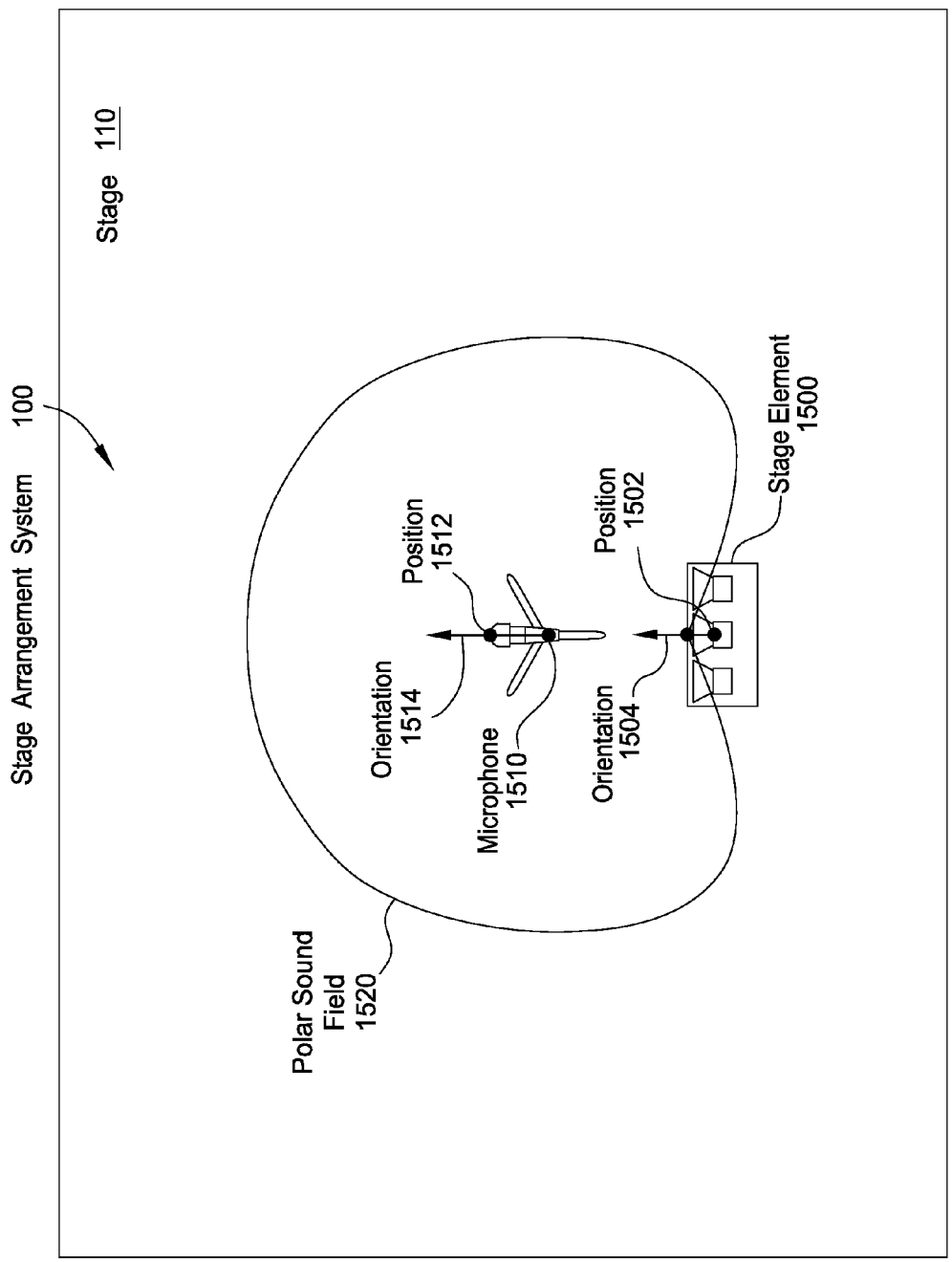
Figure 15G:
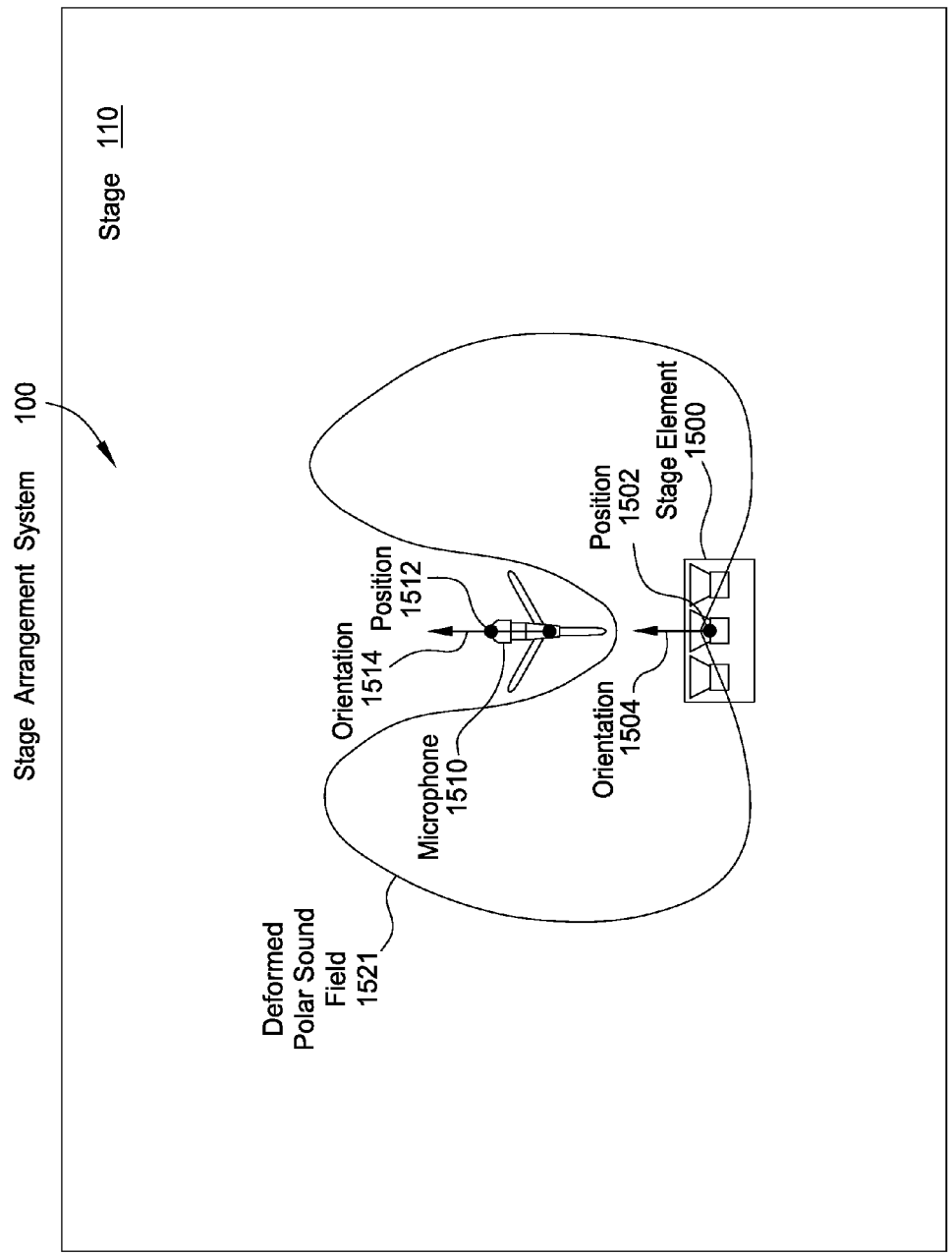

In FIG. 15E, stage element 1500 includes multiple micro-electric-mechanical systems (MEMS) devices 1501. MEMS devices 1501 are small actuators, each of which is configured to generate acoustic output. Each MEMS device may be activated separately, and so the sound field generated by stage element 1500 may be precisely controlled. Stage element 1500 may thus generate a sound field 1511 having an arbitrary shape. Accordingly, stage arrangement system 100 may detect potential feedback between stage element 1500 and microphone 1510, and then cause stage element 1500 to "steer" sound field 1511 away from receptive zone 1516. With this approach, stage element 1500 and microphone 1510 need not be repositioned or reoriented to reduce feedback. In various other embodiments, any other technically feasible device for generating a dynamically modifiable sound field may replace MEMS devices 1501. FIGS. 15F-15G illustrate another approach to modifying a sound field.

In FIG. 15F, stage element 1500 resides at position 1502 with orientation 1504, while microphone 1510 resides at position 1512 with orientation 1514. Stage element 1500 generates a polar sound field 1520 that substantially includes microphone 1510. The region enclosed by polar sound field 1520 generally reflects an area where the magnitude of sound produced by stage element 1500 exceeds a given threshold value. Stage element 1500 is configured to manipulate the size and/or shape of polar sound field 1520 in order to avoid including microphone 1510 in that sound field, thereby reducing the effects of feedback between stage element 1500 and microphone 1510.

In FIG. 15G, stage element 1500 modifies polar sound field 1520 to generate a deformed polar sound field 1521, which does not include microphone 1510. As previously mentioned, stage element 1500 may include MEMS devices, an array of conventional speakers, or any other technically feasible device capable of generating a dynamically modifiable sound field, without limitation. In this fashion, stage element 1500 may reduce feedback with other elements on stage 110. The aforementioned approach may also be practiced to generate polar sound field having asymmetric shapes, as described in greater detail below.

Figure 15H:
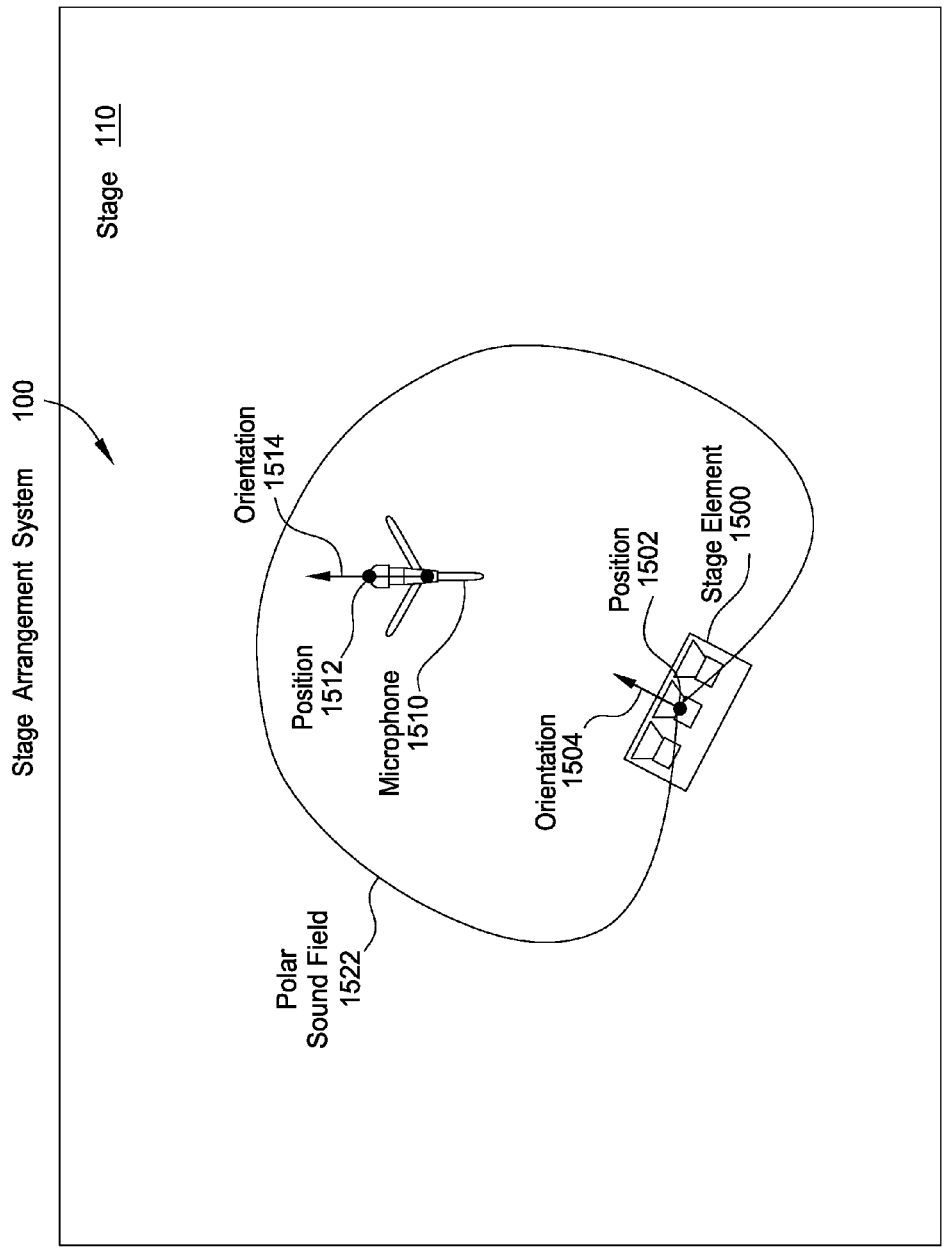

In FIG. 15H, stage element 1500 generates polar sound field 1522 that, similar to FIG. 15F, substantially includes microphone 1510. However, microphone 1510 resides at a slightly different position and orientation within polar sound field 1522 relative to stage element 1500. As such, stage element 1500 is configured to modify the shape of polar sound field 1522 to accommodate these differences.

Figure 15I:
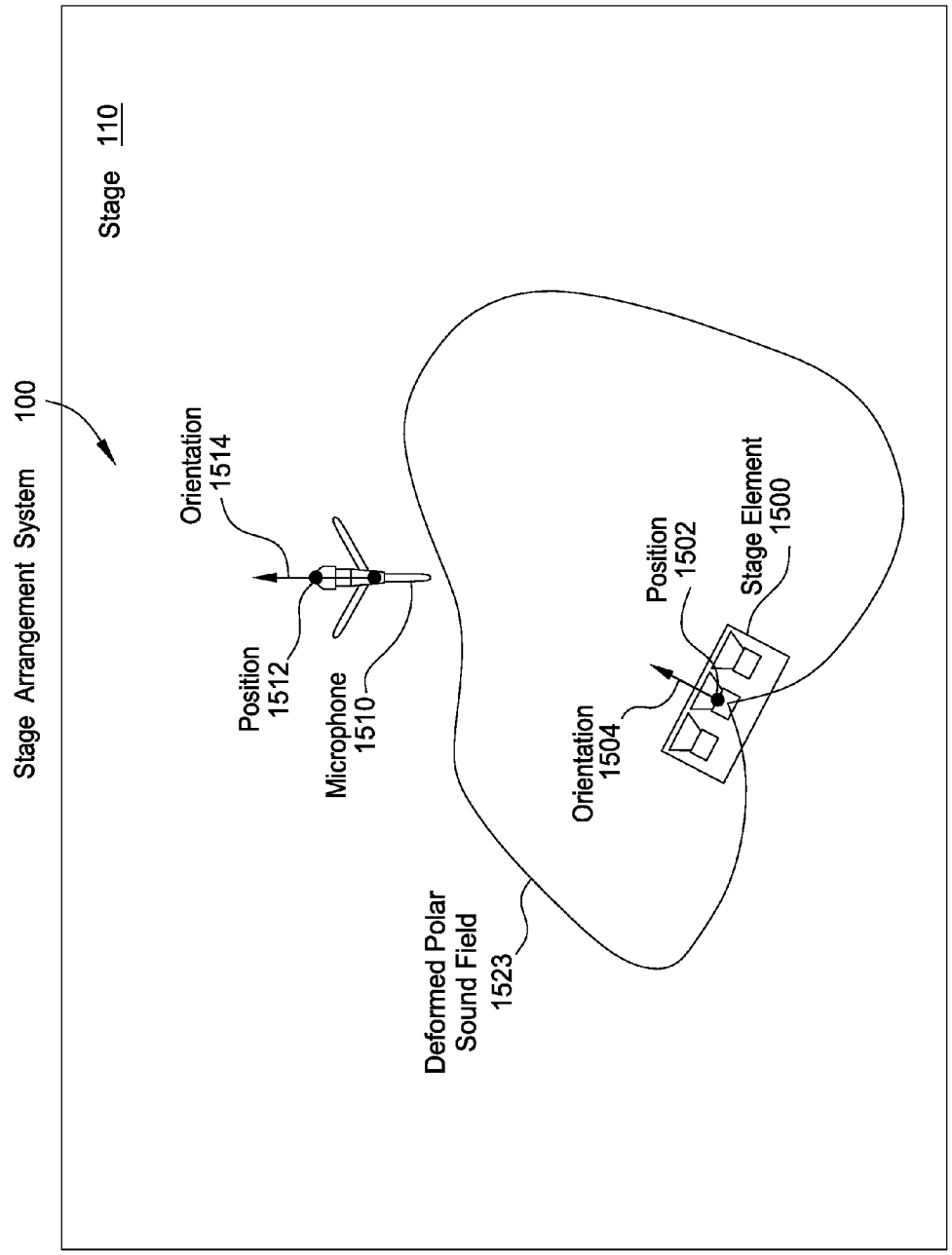

In FIG. 15I, stage element 1500 modifies polar sound field 1522 to generate deformed polar sound field 1523 that does not include microphone 1510. As is shown, deformed polar sound field 1523 is asymmetric. As a general matter, stage element 1500 may generate polar sound fields (and other types of sound fields) having any technically feasible size and shape.

Referring generally to FIGS. 15A-15I, persons skilled in the art will understand that the various techniques described thus far may be combined in any technically feasible fashion. For example, an array of speakers (i.e. non-MEMS speakers) may be implemented instead of MEMS device 1501. In addition, the aforementioned techniques are provided for illustrative purposes only, and not meant to limit the scope of the present invention. Generally, any system configured to (i) detect arrangements that may cause feedback and to then (ii) effect arrangement changes to reduce that feedback, falls within the scope of the present invention. This essential approach is described in stepwise fashion below in conjunction with FIG. 16.

Figure 16:
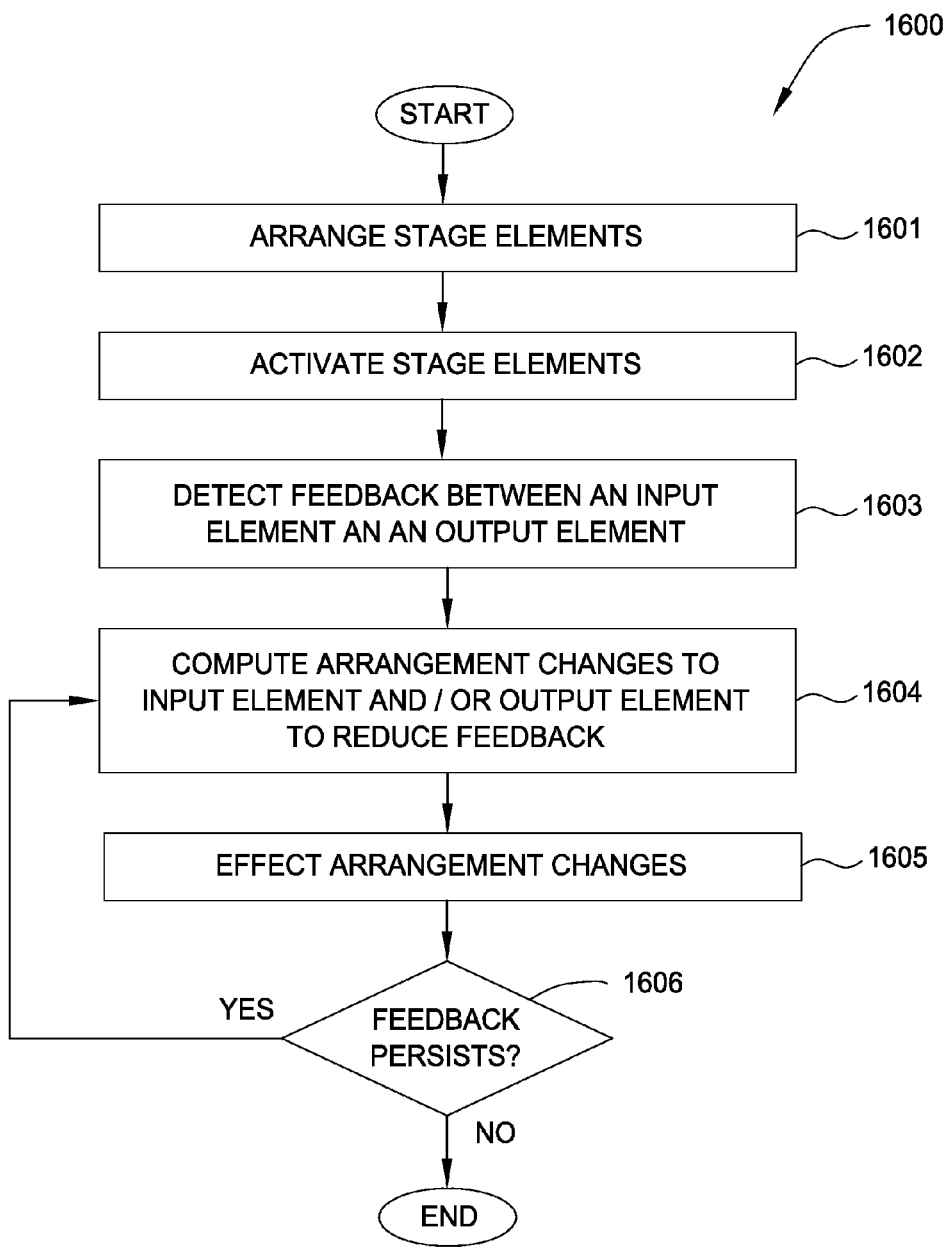
FIG. 16 is a flow diagram of method steps for reducing feedback between stage elements, according to various embodiments.

FIG. 16 is a flow diagram of method steps for reducing feedback between stage elements, according to various embodiments. Although the method steps are described in conjunction with the systems of FIGS. 1-15I, persons skilled in the art will understand that any system configured to perform the method steps, in any order, is within the scope of the present invention.

As shown a method 1600 begins at step 1601, where stage arrangement system 100 arranges the stage elements of stage 110. Stage arrangement system 100 may implement any of the techniques described thus far for positioning and orienting each element. At step 1602, stage arrangement system 100 activates those stage elements. Stage arrangement system 100 could, for example, initiate a sound test at step 1602.

At step 1603, stage arrangement system 100 detects feedback between an input element and an output element on stage 110. In one embodiment, stage arrangement system 100 need not activate the stage elements at step 1602 in order to identify feedback, and may simply process the arrangement of elements to identify overlapping sound fields and receptive zones.

In either case, at step 1604, stage arrangement system 100 computes arrangement changes to the output and/or input element in order to reduce feedback. The arrangement changes could be similar to those described above in conjunction with FIGS. 15B-15I, for example, and without limitation. At step 1605, stage arrangement system 100 effects those arrangement changes. Stage arrangement system 100 could implement any of the techniques described above in conjunction with FIGS. 4A-5B in order to effect arrangement changes.

At step 1606, stage arrangement system 100 determines whether the feedback persists. Stage arrangement system 100 could perform another sound test, analyze sound data, or simply analyze the current arrangement of elements to determine whether the feedback persists. If the feedback has been eliminated, then the method ends. Otherwise, the method returns to step 1604 and proceeds as described above.

Stage arrangement system 100 may implement the method 1600 in advance of a performance or during a performance in order to reduce feedback between stage elements. With this approach, the sound quality of elements on stage 110 may be continuously optimized, improving the experience of the audience and avoiding disturbing feedback.

In sum, a stage arrangement system is configured to arrange stage elements on a stage where a performance is to take place. The stage arrangement system is configured to move the stage elements to reflect arrangement data that reflects desired positions and orientations for each stage element. The stage arrangement system first localizes one or more stage elements by determining the position and orientation associated with each such element. Then, the stage arrangement system repositions and/or reorients each stage element to comply with the arrangement data. Each stage element may indicate position and/or orientation changes to stagehands or manual laborers, who then move each element accordingly. Alternatively, each stage element may autonomously move in order to implement the position and/or orientation changes.

The arrangement data may be received from a wide variety of sources, including, but not limited to, the performers who will perform using the stage elements, the venue sponsoring the performance, or other performers. The stage arrangement system is configured to combine many sets of arrangement data and to then effect position and orientation changes based on combined arrangement data. The stage arrangement system may also calibrate the arrangement of elements to reflect an iterative sound test, and may update that arrangement to reduce the incidence of feedback.

At least one advantage disclosed in the present application is that complex arrangements may be accomplished with relative ease compared to prior approaches, since the stage arrangement system of the present invention is capable of autonomously effecting arrangement changes. In embodiments where the stage elements are configured to move autonomously, those elements may be arranged with minimal effort required from manual laborers, decreasing setup time and reducing the risk of bodily injury to those laborers. Further, the stage arrangement system may effect arrangement change dynamically, so that the stage elements can be rearranged mid-performance (in preparation for a different performance segment or in response to accidentally perturbed element, among other examples, without limitation). Finally, the stage arrangement system disclosed herein may optimize the sound quality of a given arrangement by calibrating that arrangement and reducing feedback, thereby simplifying the setup process and improving the audience experience of the performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A non-transitory computer-readable medium storing program instructions that, when executed by a processing unit, cause the processing unit to cause one or more stage elements to be arranged on a physical stage by performing the steps of:
  determining a current physical arrangement of a first stage element on the physical stage, wherein the first stage element comprises a physical stage element;
  determining a desired physical arrangement for the first stage element on the physical stage; and
  causing an arrangement change to be physically effected for the first stage element that causes the current physical arrangement to reflect the desired physical arrangement, comprising at least one of:
    activating at least one visual indicator that directs a person to alter the current physical arrangement of the first stage element to reflect the desired physical arrangement, and
    transmitting one or more signals to at least one actuator, wherein the at least one actuator alters the current physical arrangement of the first stage element to reflect the desired physical arrangement,
  wherein altering the current physical arrangement comprises physically altering at least one of a current physical position of the first stage element on the physical stage and a current physical orientation of the first stage element on the physical stage to reflect the desired physical arrangement.

2. The non-transitory computer-readable medium of claim 1, wherein the current physical arrangement includes the current physical position and the current physical orientation of the first stage element with respect to the physical stage, and wherein the desired physical arrangement includes a desired physical position and a desired physical orientation of the first stage element with respect to the physical stage.

3. The non-transitory computer-readable medium of claim 1, wherein the step of determining the current physical arrangement comprises:
   determining the current physical position of the first stage element on the physical stage relative to a central position on the physical stage; or
   determining the current physical orientation of the first stage element on the physical stage relative to a reference orientation associated with the physical stage.

4. The non-transitory computer-readable medium of claim 1, wherein the step of determining the current physical arrangement comprises:
   determining the current physical position of the first stage element on the physical stage relative to a plurality of non-central positions on the physical stage; or
   determining the current physical orientation of the first stage element on the physical stage relative to a plurality of distributed reference orientations.

5. The non-transitory computer-readable medium of claim 1, wherein the step of determining the desired physical arrangement comprises generating arrangement data based on one or more of a custom arrangement data, a venue arrangement data, a default arrangement data, and a shared arrangement data.

6. The non-transitory computer-readable medium of claim 1, wherein determining the desired physical arrangement for the first stage element comprises:
   acquiring arrangement data that reflects the current physical arrangement associated with the first stage element;
   performing a calibration test with the first stage element to generate calibration test results; and
   calibrating the arrangement data based on the calibration test results to generate calibrated arrangement data.

7. The non-transitory computer-readable medium of claim 1, wherein the indicator comprises hardware coupled to the first stage element or an image projected onto the stage.

8. The non-transitory computer-readable medium of claim 1, wherein causing an arrangement change to be physically effected for the first stage element comprises causing the first stage element to autonomously perform the rearrangement procedure by transmitting the one or more signals to a mechanical actuator that is coupled to the first stage element and configured to cause at least one of the first stage element to move locations and the first stage element to change orientations.

9. The non-transitory computer-readable medium of claim 1, wherein causing the arrangement change to be physically effected for the first stage element comprises transmitting the one or more signals to the at least one actuator, wherein the one or more signals cause the at least one actuator to alter the current physical arrangement of the first stage element to reflect the desired physical arrangement.

10. A system configured to arrange stage elements on a physical stage, comprising:
   a memory; and
   a processor coupled to the memory, wherein the processor:
      determines at least one of a current physical position and a current physical orientation of a first stage element on the physical stage, wherein the first stage element comprises a physical stage element,
      determines at least one of a desired physical position and a desired physical orientation for the first stage element on the physical stage, and
      causes an arrangement change to be physically effected for the first stage element that causes at least one of the current physical position to reflect the desired physical position and the current physical orientation to reflect the desired physical orientation, comprising at least one of:
         activating at least one visual indicator that directs a person to alter the current physical arrangement of the first stage element to reflect the desired physical arrangement, and
         transmitting one or more signals to at least one actuator, wherein the at least one actuator alters the current physical arrangement of the first stage element to reflect the desired physical arrangement,
         wherein altering the current physical arrangement comprises physically altering at least one of the current physical position of the first stage element on the physical stage and the current physical orientation of the first stage element on the physical stage to reflect the desired physical arrangement.

11. The system of claim 10, wherein the processor further determines that the current physical arrangement causes a feedback loop between the first stage element and a second stage element.

12. The system of claim 11, wherein physically effecting the arrangement change comprises repositioning the first stage element to reduce feedback generated by the feedback loop.

13. The system of claim 11, wherein physically effecting the arrangement change comprises reorienting the first stage element to reduce feedback generated by the feedback loop.

14. The system of claim 11, wherein physically effecting the arrangement change comprises directing a sound field generated by the first stage element away from the second stage element to reduce feedback generated by the feedback loop.

15. A computer-implemented method for causing stage elements to be arranged on a physical stage, the method comprising:
   determining a current physical arrangement of a first stage element on the physical stage, wherein the first stage element comprises a physical stage element;
   determining a desired physical arrangement for the first stage element on the physical stage; and
   causing an arrangement change to be physically effected for the first stage element that causes the current physical arrangement to reflect the desired physical arrangement, comprising at least one of:
      activating at least one visual indicator that directs a person to alter the current physical arrangement of the first stage element to reflect the desired physical arrangement, and
      transmitting one or more signals to at least one actuator, wherein the at least one actuator alters the current physical arrangement of the first stage element to reflect the desired physical arrangement,
      wherein altering the current physical arrangement comprises altering at least one of a current physical position of the first stage element on the physical stage and a current physical orientation of the first stage element on the physical stage to reflect the desired physical arrangement.

16. The computer-implemented method of claim 15, wherein determining the current physical arrangement comprises performing a triangulation operation relative to one or more reference locations associated with the physical stage.

17. The computer-implemented method of claim 15, further comprising identifying a feedback loop between the first stage element and a second stage element.

18. The computer-implemented method of claim 17, wherein physically effecting the arrangement change reduces feedback generated by the feedback loop.

* * * * *